US010946785B2

(12) United States Patent
Fittro

(10) Patent No.: US 10,946,785 B2
(45) Date of Patent: Mar. 16, 2021

(54) EDGE-STOWABLE TENT FOR TRAILER SYSTEM

(71) Applicant: Chad M. Fittro, Maricopa, AZ (US)

(72) Inventor: Chad M. Fittro, Maricopa, AZ (US)

( * ) Notice: Subject to any disclaimer, the term of this patent is extended or adjusted under 35 U.S.C. 154(b) by 141 days.

(21) Appl. No.: 16/246,057

(22) Filed: Jan. 11, 2019

(65) Prior Publication Data

US 2019/0291630 A1    Sep. 26, 2019

Related U.S. Application Data

(60) Provisional application No. 62/647,049, filed on Mar. 23, 2018.

(51) Int. Cl.
*B60P 3/34* (2006.01)
*E04H 15/06* (2006.01)
*E04H 15/48* (2006.01)

(52) U.S. Cl.
CPC ............. *B60P 3/341* (2013.01); *E04H 15/06* (2013.01); *E04H 15/48* (2013.01)

(58) Field of Classification Search
CPC . B60P 3/34; B60P 3/341; E04H 15/06; E04H 15/48; E04H 15/64; E04H 15/646
USPC .................................. 296/168, 169, 173, 174
See application file for complete search history.

(56) References Cited

U.S. PATENT DOCUMENTS

| | | | | | |
|---|---|---|---|---|---|
| 2,826,210 | A | * | 3/1958 | Heil ........................ | B60P 3/341 135/132 |
| 3,062,579 | A | * | 11/1962 | Smith ...................... | B60P 3/341 296/173 |
| 3,752,528 | A | * | 8/1973 | Barker ...................... | B60P 3/34 296/164 |
| 3,995,649 | A | * | 12/1976 | Robichaud .............. | E04H 15/06 135/133 |
| 4,014,586 | A | | 3/1977 | Swofford | |
| 4,088,363 | A | * | 5/1978 | Palmer .................... | B60P 3/341 296/161 |
| 4,420,182 | A | * | 12/1983 | Kaneshiro ................ | B60R 9/10 296/158 |
| 4,682,618 | A | * | 7/1987 | Zwick ..................... | B60P 3/341 135/119 |
| 4,754,998 | A | | 7/1988 | Lejuerme | |
| 5,375,902 | A | * | 12/1994 | Church ................... | B60P 3/341 296/169 |
| 5,582,456 | A | * | 12/1996 | Hammond ............. | B60J 1/2011 135/88.07 |

(Continued)

*Primary Examiner* — Gregory A Blankenship
(74) *Attorney, Agent, or Firm* — Keith L. Jenkins, Registered Patent Attorney, LLC; Keith L. Jenkins

(57) ABSTRACT

A tent stowable around edges of a flatbed trailer to leave the floor of the flatbed trailer open for cargo and motor toys. The edge-stowable tent is supported internally by three rotationally deployable squared-off U-shaped supports. To be stowed, the tent and tent supports rotate to align with the front top edge and front portions of side top edges of the flatbed trailer. To be deployed, the tent and tent supports rotate to bring the rear edge of the tent to the rear edge of the flatbed trailer. Opposite legs of U-shaped tent supports are coupled to respective mounting supports on each side of the trailer, and rotate about aligned right-angled flanges to erect the tent. Support bars, attached to the top surfaces of front and side trailer walls or frame, support fasteners for bottom edges of the tent. The tent is stowed and erected by various means.

18 Claims, 19 Drawing Sheets

(56) References Cited

U.S. PATENT DOCUMENTS

| | | | | |
|---|---|---|---|---|
| 6,017,081 | A * | 1/2000 | Colby | B60P 3/341 |
| | | | | 296/168 |
| 8,528,963 | B1 | 9/2013 | Brawley | |
| 9,394,718 | B1 * | 7/2016 | Hill | A01K 97/01 |
| 2006/0043768 | A1 * | 3/2006 | Ray | B60P 3/341 |
| | | | | 296/173 |
| 2007/0296246 | A1 * | 12/2007 | Roseborough | B62D 63/061 |
| | | | | 296/159 |
| 2009/0001756 | A1 * | 1/2009 | Dempsey | B60P 3/341 |
| | | | | 296/173 |
| 2011/0260498 | A1 * | 10/2011 | Holtkamp | B60P 3/341 |
| | | | | 296/161 |
| 2015/0061317 | A1 * | 3/2015 | Badger | B60P 3/341 |
| | | | | 296/165 |
| 2017/0057600 | A1 * | 3/2017 | Hough | E04H 15/06 |
| 2018/0339580 | A1 * | 11/2018 | Dahlberg | E04H 15/06 |
| 2019/0291630 | A1 * | 9/2019 | Fittro | B60P 3/341 |
| 2019/0376309 | A1 * | 12/2019 | Montesalvo | E04H 15/324 |

\* cited by examiner

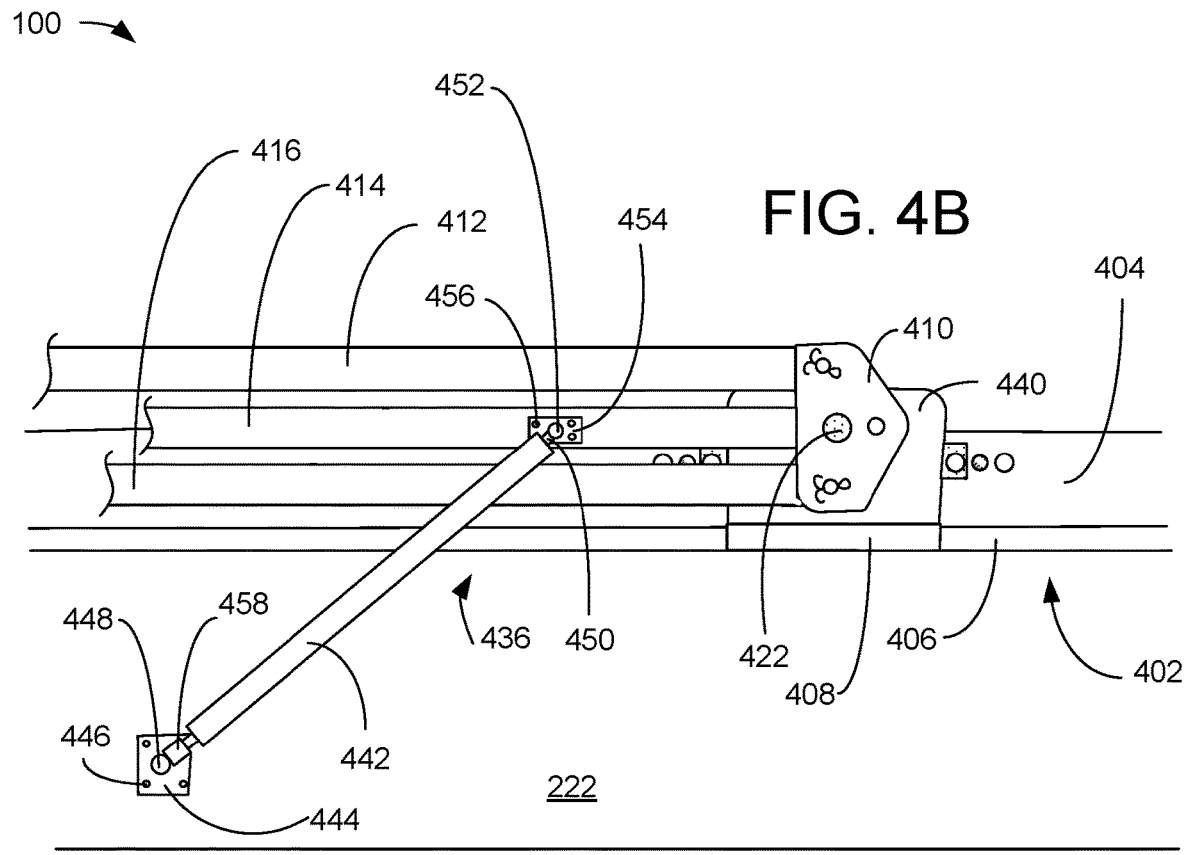

EDGE-STOWABLE TENT FOR TRAILER SYSTEM

RELATIONSHIP TO OTHER APPLICATIONS

This application claims the benefit of U.S. provisional patent application Ser. No. 62/647,049 filed 23 Mar. 2018 to the same inventor.

FIELD OF ART

The present invention relates to a tent that is deployable to cover a flatbed trailer, with or without sidewalls, and stowable along top edge surfaces of the flatbed trailer, thereby leaving the floor of the trailer open for carrying motor toys and other cargo. The present invention more particularly relates to a tent that is rapidly deployable by one person.

BACKGROUND OF THE INVENTION

A number of trailer tents have been developed in the art, but either take up cargo space on the trailer floor or deploy beside the trailer floor, rather than over it. As a result, the floor space on the trailer is either poorly used or uncovered.

SUMMARY OF THE INVENTION

Briefly described, the invention includes a tent stowable around edges of a flatbed trailer to leave the floor of the flatbed trailer open for cargo and motor toys. The edge-stowable tent is supported internally by three rotationally deployable squared-off U-shaped supports. To be stowed, the tent and tent supports rotate to align with the front top edge surface and front portions of side top edge surfaces of the flatbed trailer. To be deployed, the tent and tent supports rotate to bring the rear edge of the tent to the rear edge of the flatbed trailer. Opposite legs of U-shaped tent supports are coupled to respective mounting supports on each side of the trailer, and rotate about aligned right-angled flanges to erect the tent. Support bars, attached to the top edges of front and side trailer walls or frame, support fasteners for bottom edges of the tent. The tent is stowed and erected by various means.

DESCRIPTION OF THE FIGURES OF THE DRAWINGS

The present invention will hereinafter be described in conjunction with the following drawing figures, wherein like numerals denote like elements.

FIG. 4B is right-side interior elevation view illustrating an exemplary embodiment of a support mounting of the exemplary edge-stowable tent for trailer system of FIG. 1 in a stowed configuration with an actuator, according to a preferred embodiment of the present invention;

FIG. 4C is right-side interior elevation view illustrating an exemplary embodiment of a support mounting of the exemplary edge-stowable tent for trailer system of FIG. 1 in a deployed configuration with an actuator, according to a preferred embodiment of the present invention;

DETAILED DESCRIPTION OF THE INVENTION

Figure 1:
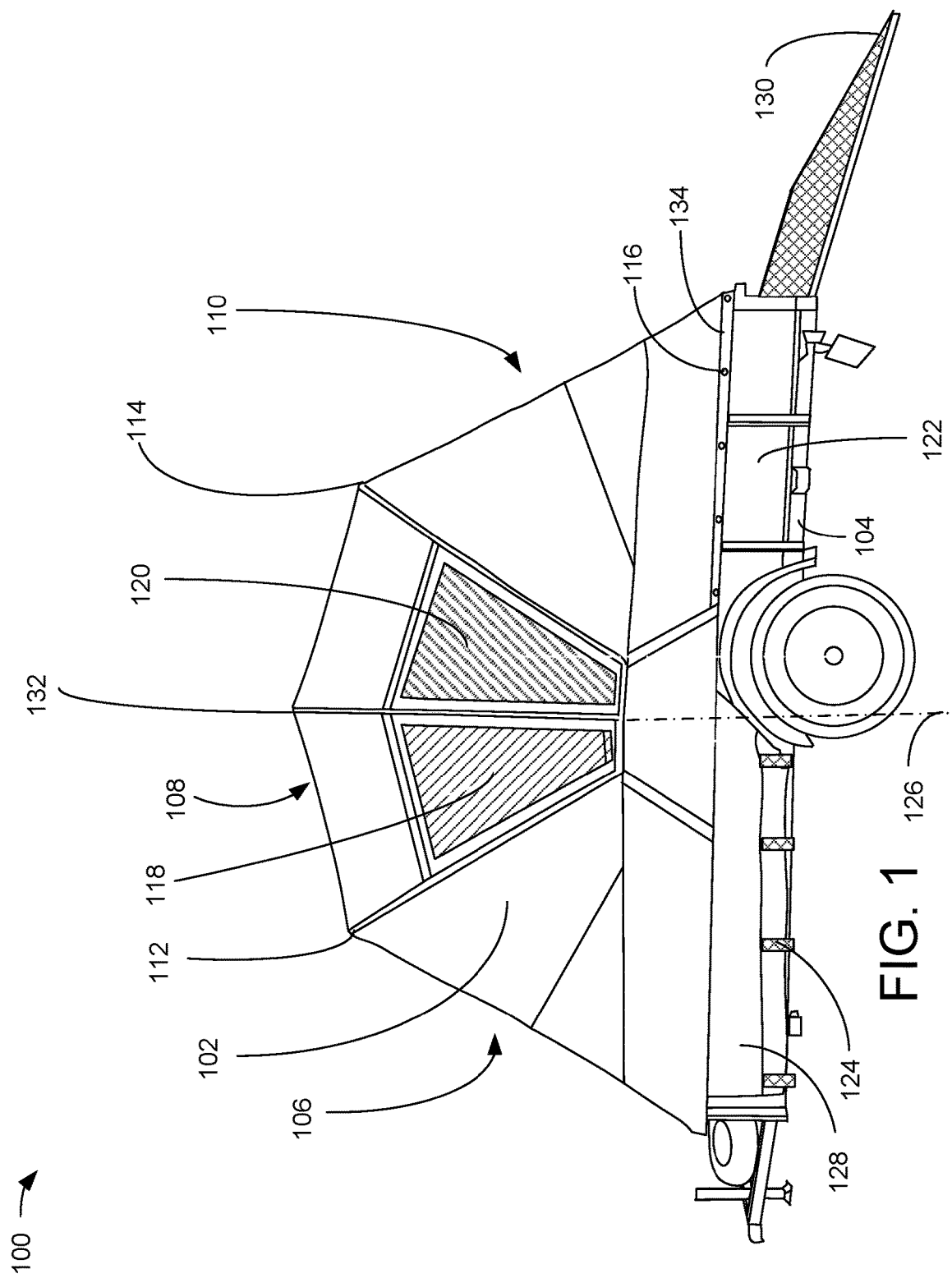
FIG. 1 is a side elevation view illustrating an exemplary embodiment of the edge-stowable tent for trailer system in a deployed configuration, according to a preferred embodiment of the present invention.
Figure 10:
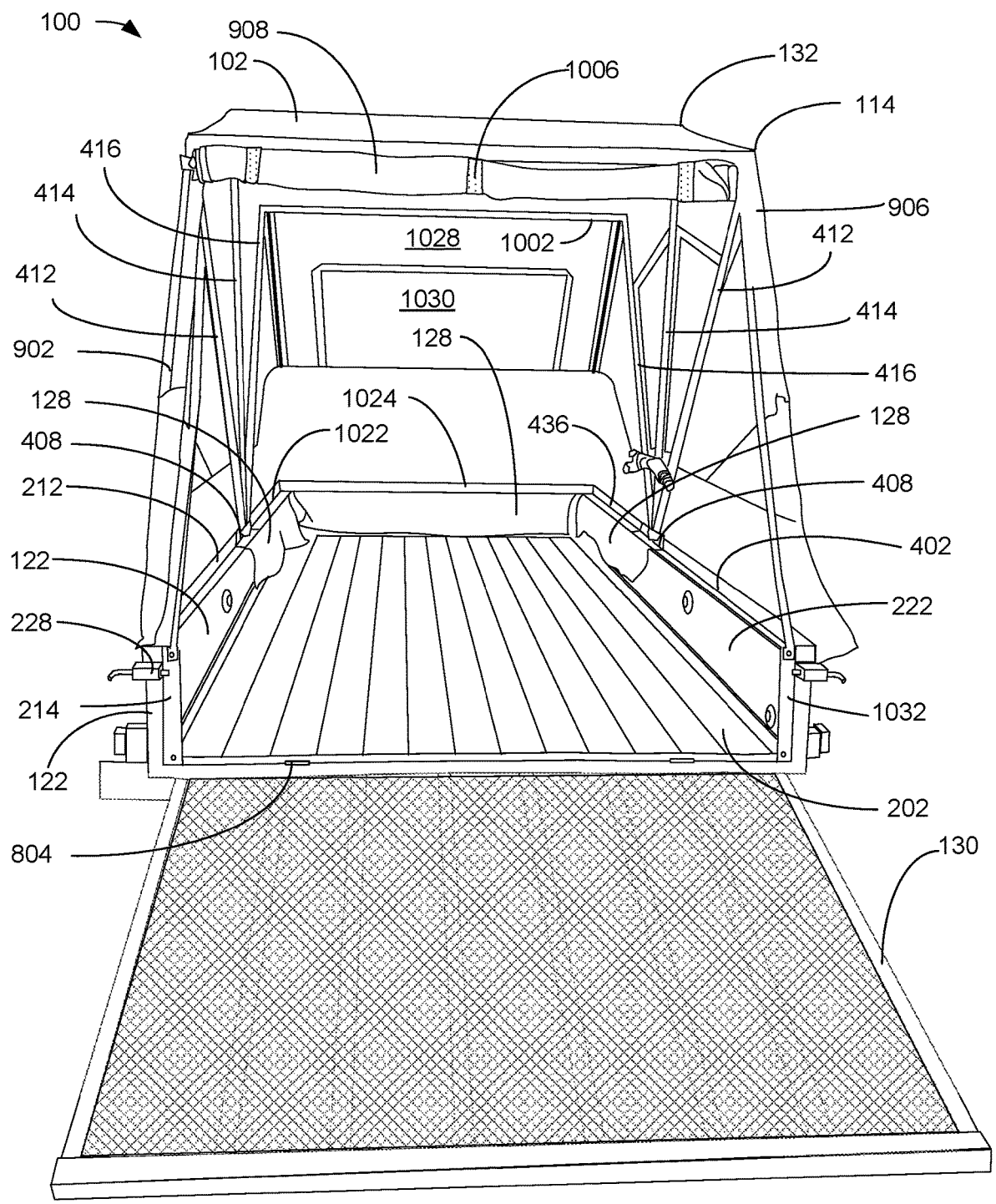
FIG. 10 is a rear perspective view illustrating an exemplary interior front wall portion of the exemplary embodiment of the edge-stowable tent for trailer system of FIG. 1 in a deployed configuration, according to a preferred embodiment of the present invention.

As used and defined herein, "front", "rear", "top", "bottom", are referenced to the operational orientation and position of the invention, as shown in FIG. 1. As used and defined herein, "left" and "right" are referenced to a viewpoint behind the invention, looking forward, as shown in FIG. 10. Like reference numbers are assigned to like parts. The hundreds and thousands digits of reference numbers correspond to the figure number of the drawing in which the referenced part is first referenced.

FIG. 1 is a side elevation view illustrating an exemplary embodiment of the edge-stowable tent for trailer system 100 in a deployed configuration, according to a preferred embodiment of the present invention. The edge-stowable tent for trailer system 100 includes left support bars 212 (see FIG. 2) and 1022 (see FIG. 10), right support bars 402 and 436 (see FIGS. 4A-C), front support bar 1024 (see FIG. 10), right-angled flanges 408 (see FIGS. 4A-C), deployable internal tent supports 412, 414, and 416 (see FIGS. 4A-C), piano hinge 218 (see FIG. 2), left and right back end support bars 214 (see FIG. 2) and 1032 (see FIG. 10), and edge-stowable tent 102. Left support bars 212 (see FIG. 2) and 1022 (see FIG. 10), right support bars 402 and 436 (see FIGS. 4A-C), front support bar 1024, right-angled flanges 408 (see FIGS. 4A-C), piano hinge 218 (see FIG. 2), and left and right back end support bars 214 (see FIG. 2) and 1032 (see FIG. 10) attach to the prior art trailer 104. Tent 102 attaches to left support bars 212 (see FIG. 2) and 1022 (see FIG. 10), right support bars 402 and 436 (see FIGS. 4A-C), front support bar 1024 (see FIG. 10) deployable internal tent supports 412, 414, and 416 (see FIGS. 4A-C), piano hinge 218 (see FIG. 2), and left and right back end support bars 214 (see FIG. 2) and 1032 (see FIG. 10). Prior art flatbed trailer 104 is a prior art flatbed trailer 104 with a front wall 206 (see FIG. 2) and left and right prior art sidewalls 122 and 222 (see FIG. 2) connected to the prior art front wall 206. The edge-stowable tent 102 has front 106, center 108 and rear 110 portions defined by deployable internal tent supports 416, 414, and 412 (see FIGS. 4A-C) that create front tent corner 112, center tent corner 132, and rear tent corner 114, respectively. Center portion 108 has two opposed left side polygonal mesh windows 118 and 120. The right side of tent 102 has similar windows. The bottom edge 134 of the edge-stowable tent 102 is shown releasably fastened to the left rear support bar 212 (see FIG. 2) with button fasteners 116 (one of five visible labeled). Button fasteners 116 that are forward (left, in FIG. 1) of the centerline 126 of edge-stowable tent 102, including those along the front support bar 1024 (see FIG. 10) on prior art front wall 206 (see FIG. 2) of prior art flatbed trailer 104, remain fastened when edge-stowable tent 102 is stowed. Edge-stowable tent 102 is also fastened in stowed configuration using tie-down straps 124 (one of four visible labeled) or, in another embodiment, stowage cover 128. Prior art flatbed trailer 104 has a hinged prior art ramp 130 that is shown in the deployed position. When stowed, prior art ramp 130 is vertical and latched. While the illustrated embodiment shows a prior art flatbed trailer 104 with left side wall 122, right side wall 222 (see FIG. 2), and front wall 206 (see FIG. 2), another embodiment of the edge-stowable tent 102 may also be stowed and deployed on a flatbed trailer that has a prior art trailer frame 216 (see FIG. 2) and no prior art sidewalls 122 and 222 (see FIG. 2) nor a prior art front wall 206 (see FIG. 2). In some embodiments, the edge-stowable tent 102 may be sized to be taller for flatbed trailers with no sidewalls 122 and 222 (see FIG. 2) or shorter for smaller trailers. While the illustrated button fasteners 116 are preferred, other types of tent bottom edge 134 fasteners 116 may be used in other embodiments. In other embodiments, mesh front left side window 118 and rear left side window 120 may be of a different size and shape. Edge-stowable tent 102 is preferably made of tent canvas but that is not a limitation of the present invention. In various embodiments, respective various fabrics may be used. For non-limiting examples, nylon or polyester fabrics may be used. While button fasteners 116 are illustrated, they are merely exemplary of fasteners generally.

Figure 2:
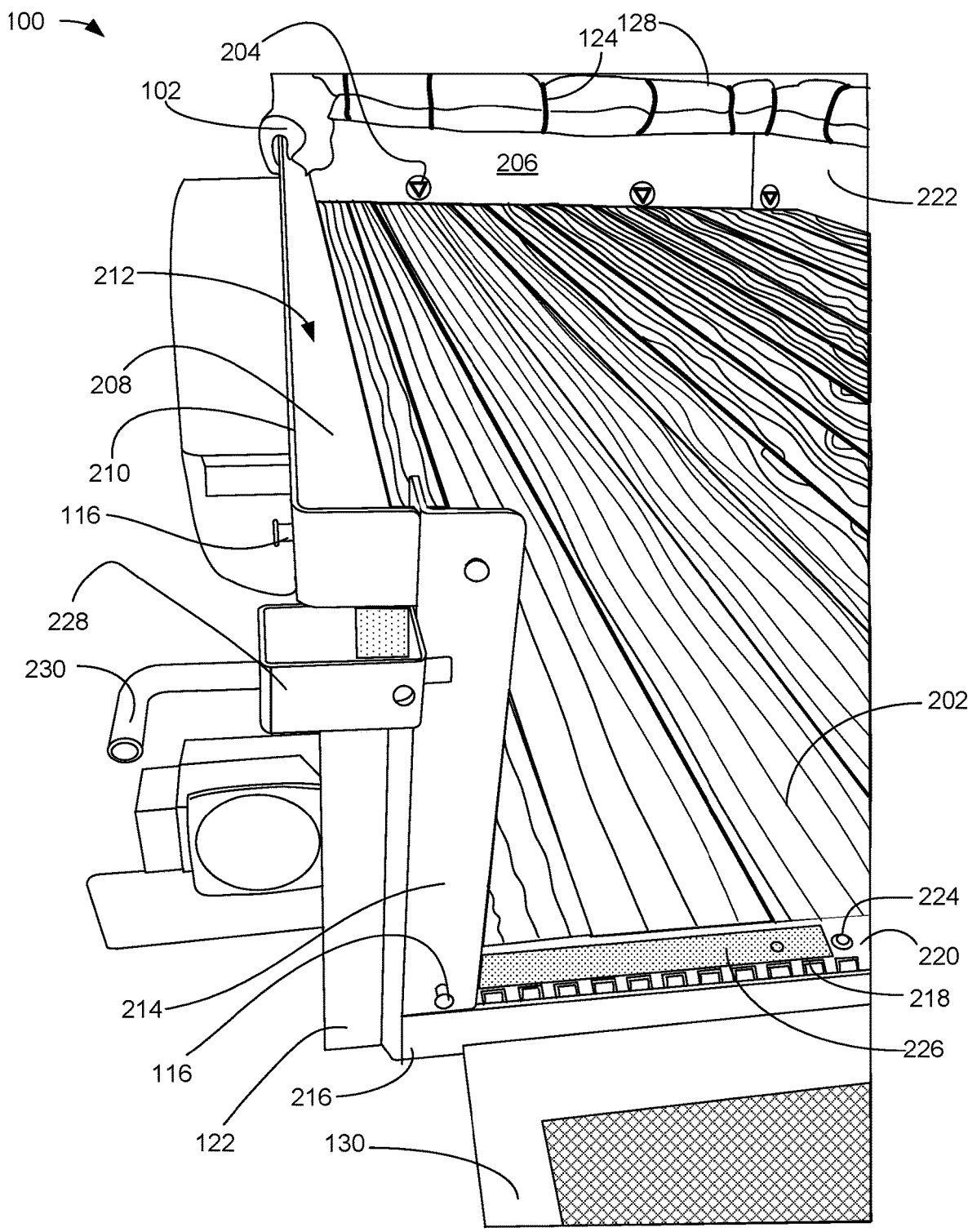
FIG. 2 is a partial rear perspective view illustrating an exemplary embodiment of the edge-stowable tent for trailer system of FIG. 1 in a stowed configuration, according to a preferred embodiment of the present invention.

FIG. 2 is a left rear perspective view illustrating an exemplary embodiment of the edge-stowable tent for trailer system 100 of FIG. 1 in a stowed configuration, according to a preferred embodiment of the present invention. Edge-stowable tent 102 is stowed on a top surface of prior art front trailer wall 206 and on tops of front portions of left and right prior art sidewalls 122 and 222 using tie-down straps 124 (one of seven visible labeled) or stowage cover 128. Left rear support bar 212 has a horizontal portion 208 and a vertical portion 210. Button fasteners 116 extend outward from the exterior side of the vertical portion 210 of the left rear support bar 212. Tie-down anchors 204 (one of three visible labeled) assist in securing cargo on the prior art flatbed trailer floor 202. Prior art latch support 228 carries prior art latch pin 230 for securing the prior art ramp 130 in a stowed position. Piano hinge 218 has a top hinge flange 220 that supports snaps 224 for connecting with complimentary snap parts 932 (see FIG. 9) on the bottom edge of the rear tent panel 930 (see FIG. 9). Top hinge flange 220 optionally also supports hook and loop fastener 226.

Figure 3:
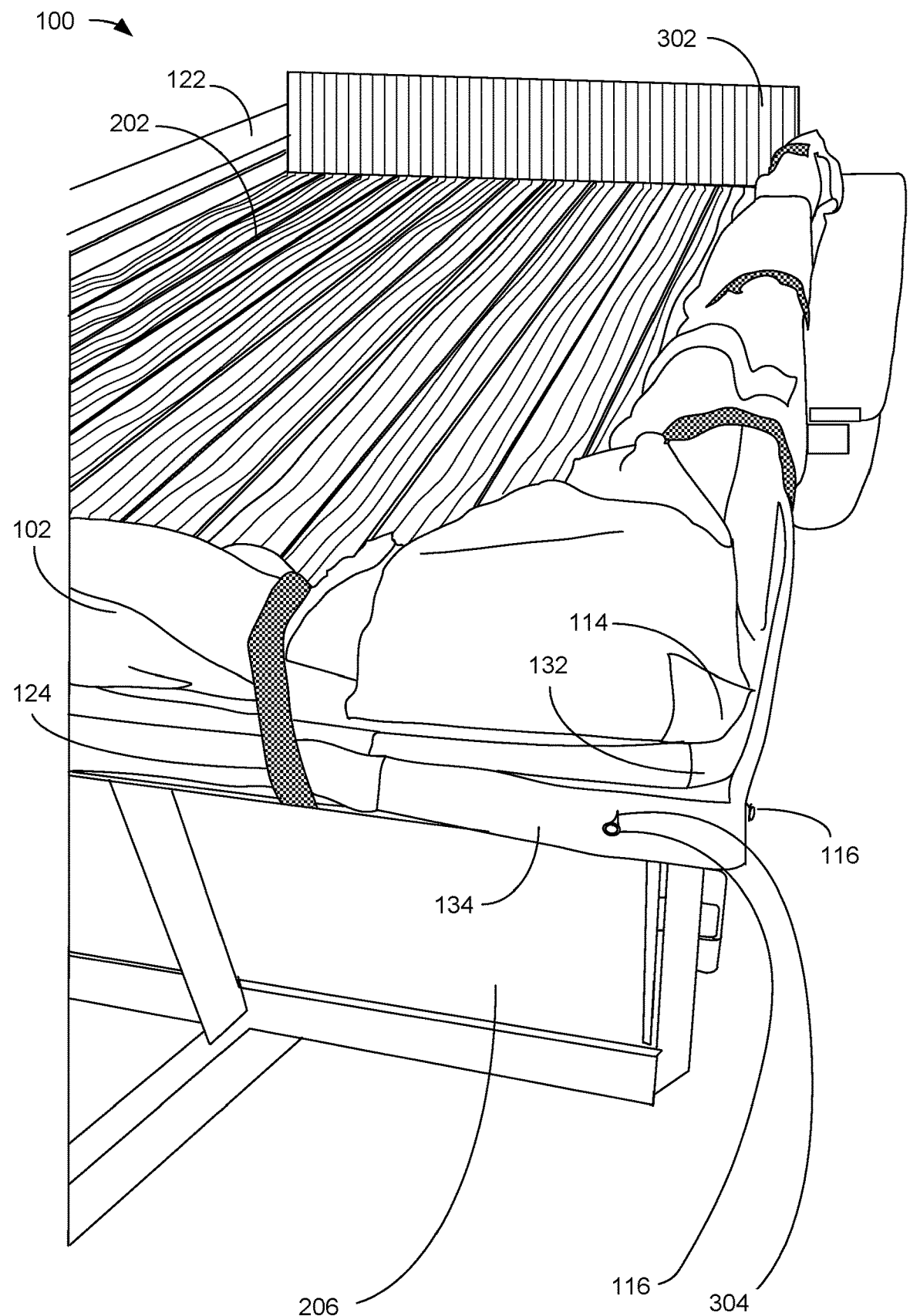
FIG. 3 is a partial front corner perspective view illustrating an exemplary embodiment of the edge-stowable tent for trailer system of FIG. 1 in a stowed configuration, according to a preferred embodiment of the present invention.

FIG. 3 is a left front corner perspective view illustrating an exemplary embodiment of the edge-stowable tent for trailer system 100 of FIG. 1 in a stowed configuration, according to a preferred embodiment of the present invention. FIG. 3 illustrates an embodiment without stowage cover 128. Rear tent corner 114 and center tent corner 132 are shown, with front tent corner 112 hidden beneath center tent corner 132. Button hole 304 is visible in this view and is receiving a button fastener 116 that extends from a front support bar 1024 (see FIG. 10), similar to right front support bar 436 (see FIG. 4A-C), which is fastened to the top surface of prior art front wall 206. In various embodiments, the button hole 304 may have grommets. In various embodiments, respective various fasteners may be used in place of button fasteners 116. Tie-down straps 124 (one of four visible labeled) are used directly on the tent 102. Diagrammatically represented cargo 302 may be of various types, such as, without limitation, motor toys, camping equipment, fuel, watercraft, hang gliders, and the like.

Figure 4A:
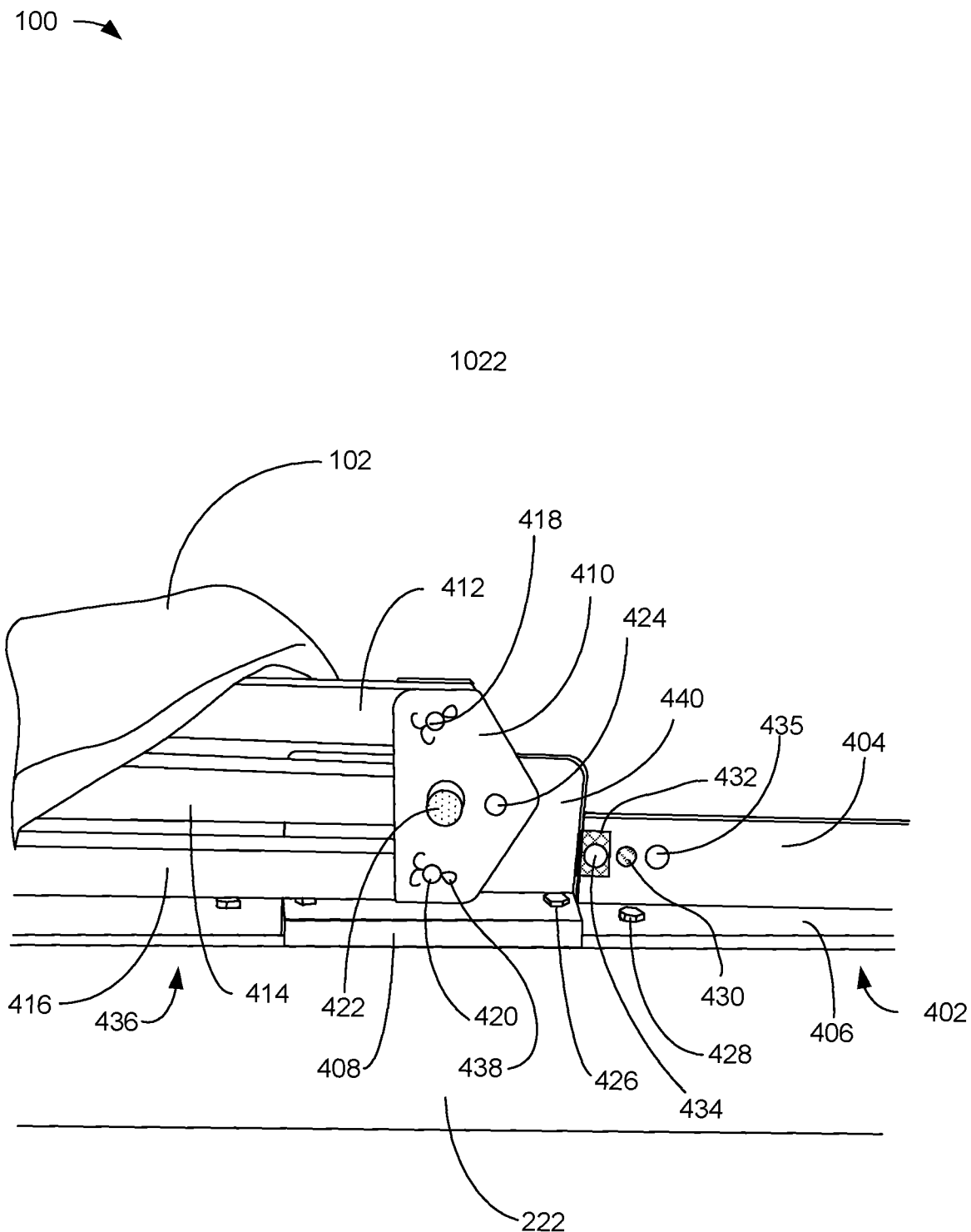
FIG. 4A is right-side interior elevation view illustrating an exemplary embodiment of a support mounting of the exemplary edge-stowable tent for trailer system of FIG. 1 in a stowed configuration, according to a preferred embodiment of the present invention.

FIG. 4A is right-side interior elevation view illustrating an exemplary embodiment of a support mounting 410 of the exemplary edge-stowable tent for trailer system 100 of FIG. 1 in a stowed configuration, according to a preferred embodiment of the present invention. Right rear support bar 402 and right front support bar 436 are elongated angle pieces, preferably of steel. Right rear support bar 402 has an operationally horizontal portion 406 and an operationally vertical portion 404. Right front support bar 436 is similar to right rear support bar 212. Horizontal portion 406 is secured to the top surface 502 (see FIG. 5) of the trailer right side wall 222 using bolts 428 (one of two labeled). An external side of vertical portion 404 supports button fasteners 116, rear portions 430 of which are visible in this view. Vertical portion 404 also supports disc fasteners 434 for securing hook and loop fasteners 432 between button fasteners 116 for added closure against weather. In particular embodiments, hook and loop fasteners 432 and disc fasteners 434 may be omitted. Between right front support bar 436 and right rear support bar 402, a right-angled flange 408 is secured to the trailer right-side wall 222 top surface 502 (see FIG. 5) using bolts 426 (one of two labeled). In other embodiments, clamps may substitute for bolts 426. The vertical portion 440 of right-angled flange 408 pivotally supports a support mounting 410 via main pivot pin 422. Support mounting 410 is rigidly attached to center internal deployable tent support 414 by, for non-limiting examples, welding, adhesive, rivets, and the like. Rear deployable tent internal support 412 is pivotally supported on support mounting 410 via a support pivot pin 418 that is secured with a cotter pin 438 (one of two labeled). Front deployable tent support 416 is pivotally supported on support mounting 410 via a support pivot pin 420 that is secured with a cotter pin 438 (one of two labeled). In a particular embodiment, blind rivets may be used for pivot pins 418 and 420 without the need for cotter pins 438. When deployed, support mounting 410 is rotated ninety degrees clockwise to orient center deployable internal tent support 414 in a vertical position. Through bore 424 will align, when support mounting 410 is rotated, with a complimentary bore 1404 (see FIG. 14) through vertical portion 440 of right-angled flange 408, such that a pin 602 (see FIG. 6) may be inserted into through bore 424 and into complimentary bore 1404 (see FIG. 14) through vertical portion 440 of right-angled flange 408 to maintain support mounting 410 in a deployed configuration. The hook and loop fastener 432 crosses the exterior side of right rear support bar 402. Disc fastener 435 is an interior end of a disc fastener 434 that fastens hook and loop fastener 432 on the exterior side of right rear support bar 402.

FIG. 4B is a right-side interior elevation view illustrating an exemplary additional embodiment of a support mounting 410 of the exemplary edge-stowable tent for trailer system 100 of FIG. 1 in a stowed configuration with an actuator 442, according to a preferred embodiment of the present invention. In this embodiment, edge-stowable tent 102 may be assisted in deployment using actuator 442, illustrated here as a gas piston 442, that is attached between the interior surface of prior art right side wall 222 and center internal deployable tent support 414. Center internal deployable tent support 414 is preferably fixed to support mounting 410. The anchored end of actuator 442 is pivotally connected to plate 444 by pivot joint 448. Plate 444 is fixed to the trailer right sidewall 222 with fasteners 446 (one of three visible of four labeled). Power fitting 458, illustrated here as a gas fitting 458, is the energy input point for the actuator 442. The dynamic end of the actuator 442 is pivotally connected to center internal deployable tent support 414 using plate 454 that supports pivot 452 on the end of dynamic member 450, illustrated here as piston 450, of actuator 442. Plate 454 is fixed to center internal deployable tent support 414 using fasteners 456 (one of three visible of four labeled). No energy is applied to the actuator 442 in the stowed position during transportation and storage. Preferably, a pin 602 (see FIG. 6) is used to lock the support mounting 410 in the stowed position.

FIG. 4C is right-side interior elevation view illustrating an exemplary embodiment of a support mounting 410 of the exemplary edge-stowable tent for trailer system 100 of FIG. 1 in a deployed configuration with an actuator 442, according to a preferred embodiment of the present invention. Actuator 442 is shown in an extended configuration, which has pushed center internal deployable tent support 414 and support mounting 410 into a deployed configuration. Front deployable internal tent support 416 has been carried into a deployed configuration by tension in the tent fabric created as center internal deployable tent support 414 is raised. Rear deployable internal tent support 412 is pushed up when center internal deployable tent support 414 is raised and then falls to its deployed position, as shown.

Those of skill in the art, enlightened by the present disclosure, will appreciate the various types of actuators 442 that are suitable for erecting edge-stowable tent 102. For example, an electric screw actuator may serve. Likewise, a spring that is compressed and latched during stowage, and released and latched during erection, may serve.

Figure 5:
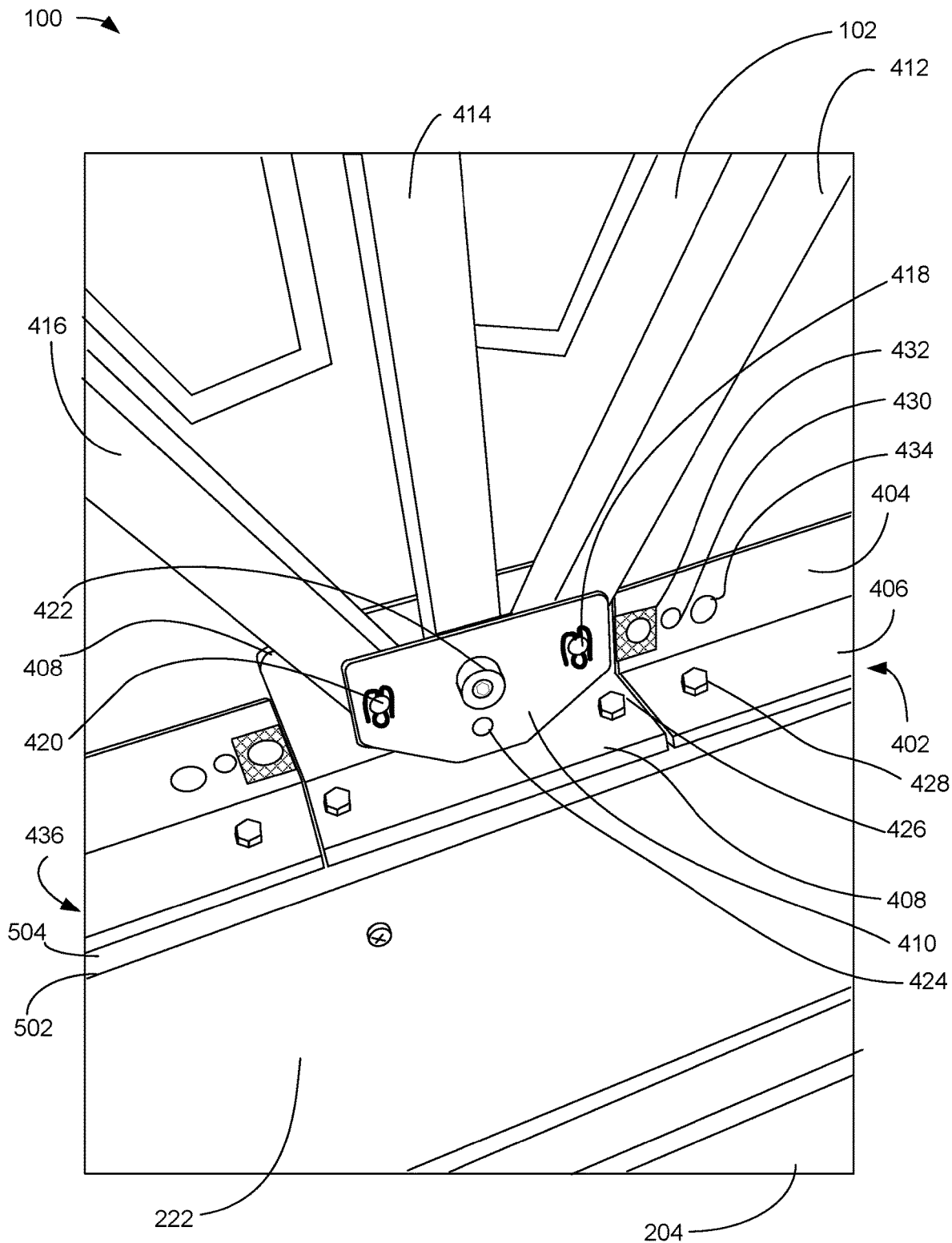
FIG. 5 is a side perspective view illustrating the exemplary embodiment of the support mounting of the exemplary edge-stowable tent for trailer system of FIG. 1 in a semi-deployed configuration, according to a preferred embodiment of the present invention.

FIG. 5 is an interior right-side perspective view illustrating the exemplary embodiment of the support mounting 410 of the exemplary edge-stowable tent for trailer system 100 of FIG. 1 in a semi-deployed configuration, according to a preferred embodiment of the present invention. The support mounting 410 is "semi-deployed" because the through bore 424 lacks a pin 602 (see FIG. 6) to complete deployment. The top surface 502 of right side wall 222 is more easily seen in this view. Between top surface 502 and right support bars 402 and 436, as well as right-angle flange 408, a layer of weather stripping 504, such as closed-cell, UV-resistant foam rubber, is interposed to compensate for surface irregularities from weld joints and the like. A slight separation between left forward support bar 436 and right-angle flange 408 can be seen in this view. Each of the opposing side walls 122 and 222 have similar aligned support mountings 410 and forward support bars 436 and 1022 (see FIG. 10), rear support bars 212 and 402, and right-angle flanges 408. An advantage of having separate left support bars 212 and 436, right-angle flange 408, and separate support mounting 410 is that support bars of various lengths, corresponding to respective various sizes of flatbed trailers 104, may be manufactured and stocked. The top surface of prior art front wall 206 has a front wall support bar 1024 (see FIG. 10), extending the full width of the prior art flatbed trailer 104, that supports button fasteners 116 and hook and loop fasteners similar to hook and loop fasteners 432. Various lengths of front wall support bars, corresponding to respective various sizes of flatbed trailers 104, may be manufactured and stocked for the same purpose.

In other embodiments, the trailer right side wall 222 or trailer frame 216 may be originally built with the functions of right support bars 402 and 436, as well as right-angled flange 408, as part of the trailer right sidewall 222 and with corresponding modifications to prior art front trailer wall 206 and left side wall 122. In related embodiments, such a prior art flatbed trailer 104 may be provided with a edge-stowable tent 102 included. Flatbed trailers 104 may be made in various sizes, with respective embodiments of edge-stowable tents 102 sized for each size of flatbed trailer 104.

Figure 6:
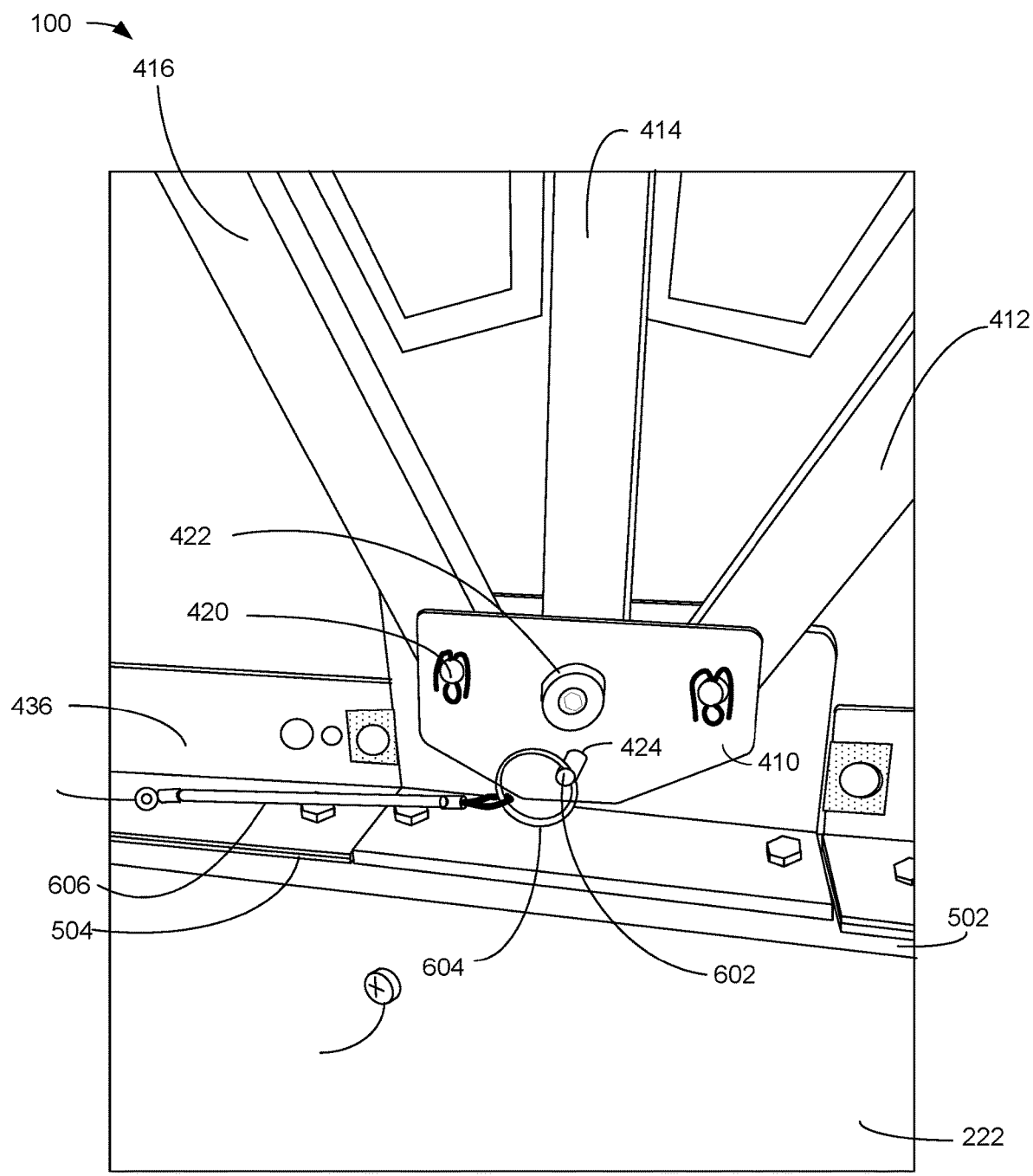
FIG. 6 is a side perspective view illustrating the exemplary embodiment of the support mounting of the exemplary edge-stowable tent for trailer system of FIG. 1 in a fully deployed configuration, according to a preferred embodiment of the present invention.

FIG. 6 is an interior right-side perspective view illustrating the exemplary embodiment of the support mounting 410 of the exemplary edge-stowable tent for trailer system 100 of FIG. 1 in a fully deployed configuration, according to a preferred embodiment of the present invention. Pin 602 has been inserted into through bore 424 and through an aligned complimentary bore 1404 (see FIG. 14) in the vertical portion 440 of right-angled flange 408 to complete deployment of support mounting 410. Pin 602 is attached to ring 604 which is attached to lanyard 606 which may be attached to any nearby fastener, bolt, or similar protrusion on support bars 402 or 436, trailer right side wall 222 or any other convenient location. Pin 602 is preferably also inserted into through bore 424 and through a second complimentary aligned bore 1406 (see FIG. 14) in the vertical portion 440 of right-angled flange 408 in the stowed configuration. In various other embodiments, respectively various securing devices may be used in place of pin 602.

Figure 7:
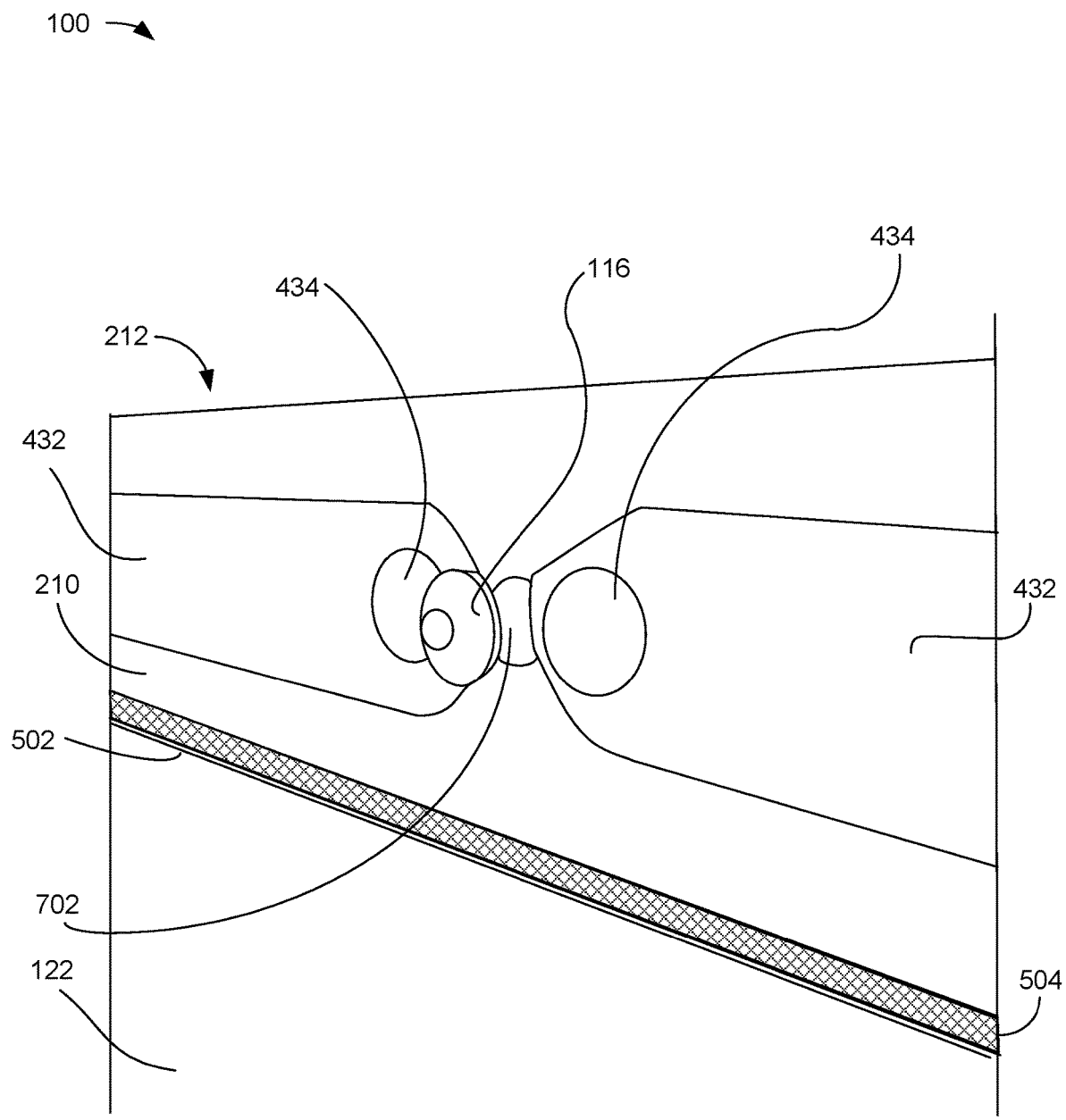
FIG. 7 is a side perspective view illustrating an exemplary exterior portion of a vertical surface of a left support bar and a portion of a left side wall portion of the exemplary embodiment of the edge-stowable tent for trailer system of FIG. 1, according to a preferred embodiment of the present invention.

FIG. 7 is an exterior left-side perspective view illustrating an exemplary exterior support bar 212 portion of the exemplary embodiment of the edge-stowable tent for trailer system 100 of FIG. 1, according to a preferred embodiment of the present invention. Each button fastener 116 is preferably flanked by strips of hook and loop fasteners 432 which mate with complimentary strips of hook and loop fasteners attached near the bottom inside edge of edge-stowable tent 102. Button fasteners 116 preferably include rigid pillars 702, as shown. In various embodiments, button fasteners 116 may be made variously with rivets, bolts, shoulder bolts, hybrid bolts, and similar devices.

Figure 8:
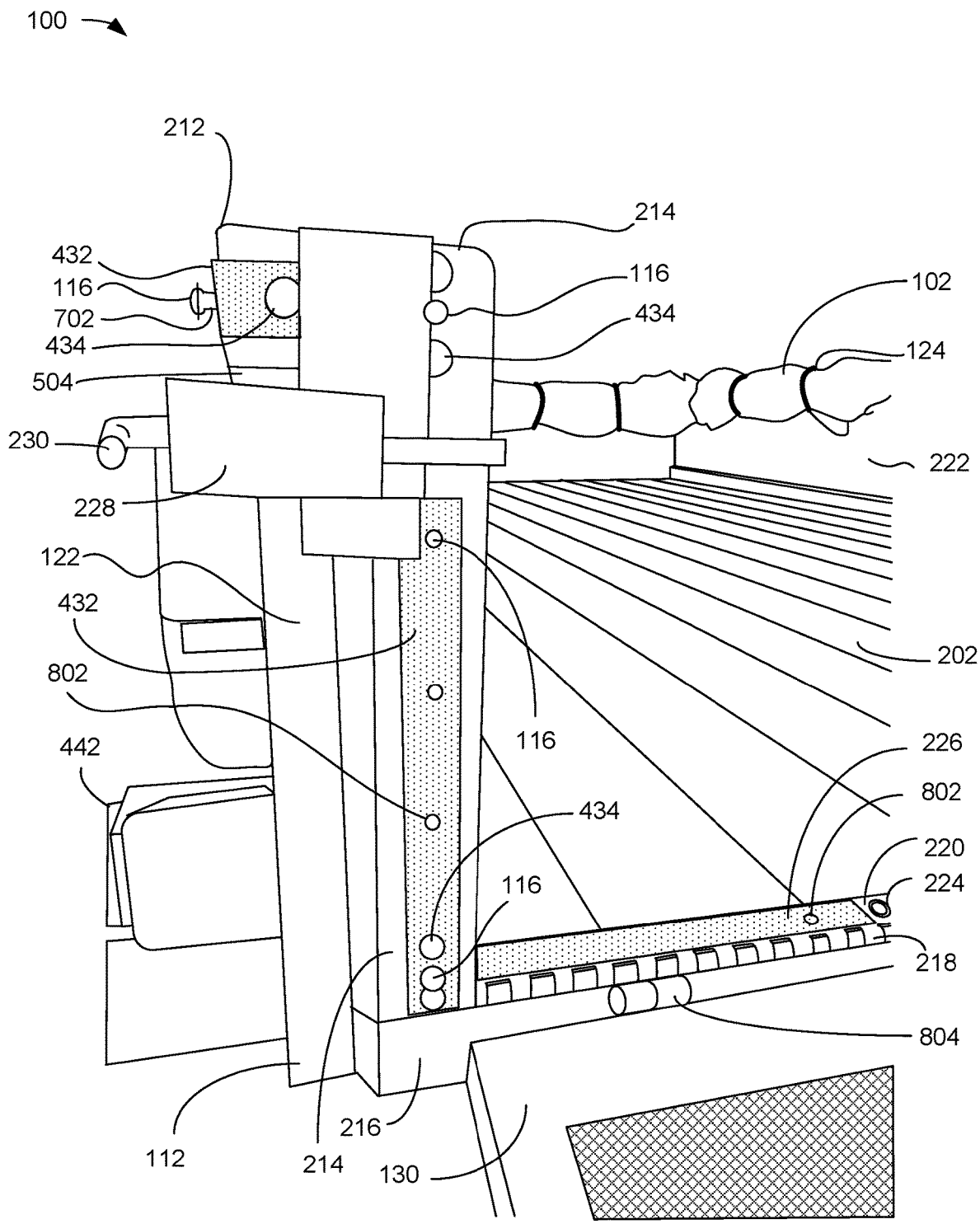
FIG. 8 is a left-rear perspective view illustrating an exemplary exterior left side wall end portion and a left back end support bar of the exemplary embodiment of the edge-stowable tent for trailer system of FIG. 1, according to a preferred embodiment of the present invention.

FIG. 8 is a left-rear perspective view illustrating an exemplary exterior left side wall 122 end portion and a left back end support bar 214 of the exemplary embodiment of the edge-stowable tent for trailer system 100 of FIG. 1, according to a preferred embodiment of the present invention. Left back end support bar 214 is attached to a vertical rear portion of left side wall 122. Left back end support bar 214 supports two button fasteners 116 with a hook and loop fastener strip 432 extending there between, as shown. Hook and loop fastener strip 432 is secured to left back end support bar 214 with disc fasteners 434 (two of four labeled) and small disc fasteners 802 (one of two labeled). Left rear support bar 212 has a horizontal hook and loop fastener strip 432 that extends around the back corner and is secured with a disc fastener 434, as shown. Optional prior art ramp latch support 228 is fastened to side wall 122 and leaves room for tent material to couple to the button fasteners 116. The right side exterior side wall 222 end portion and back end support bar 1032 (see FIG. 10) are mirror images of the illustrated left side. Priorrt art barrel hinge 804 (one visible of two labeled) connects prior art ramp 130 to prior art trailer frame 216.

Hinge 218 is shown as a piano hinge 218, but that is not a limitation of the invention. In various embodiments, respective various types of hinges may be used. The rear edge of prior art trailer bed 202 has a bottom hinge flange 1302 (see FIG. 13) of piano hinge 218 attached there to, and hook and loop fasteners 226 attached to the top hinge flange 220 of piano hinge 218 with small disc fastener 802. Top hinge flange 220 also supports snaps 224 for coupling to complimentary snaps at the bottom rear edge of edge-stowable tent 102.

Optional prior art barrel hinge 804 is connected to optional prior art ramp 130. Optional prior art ramp 130 is shown in a deployed position. During transport, optional prior art ramp 130 is rotated to the vertical, and held in place by optional prior art ramp latch supports 228.

Figure 9:
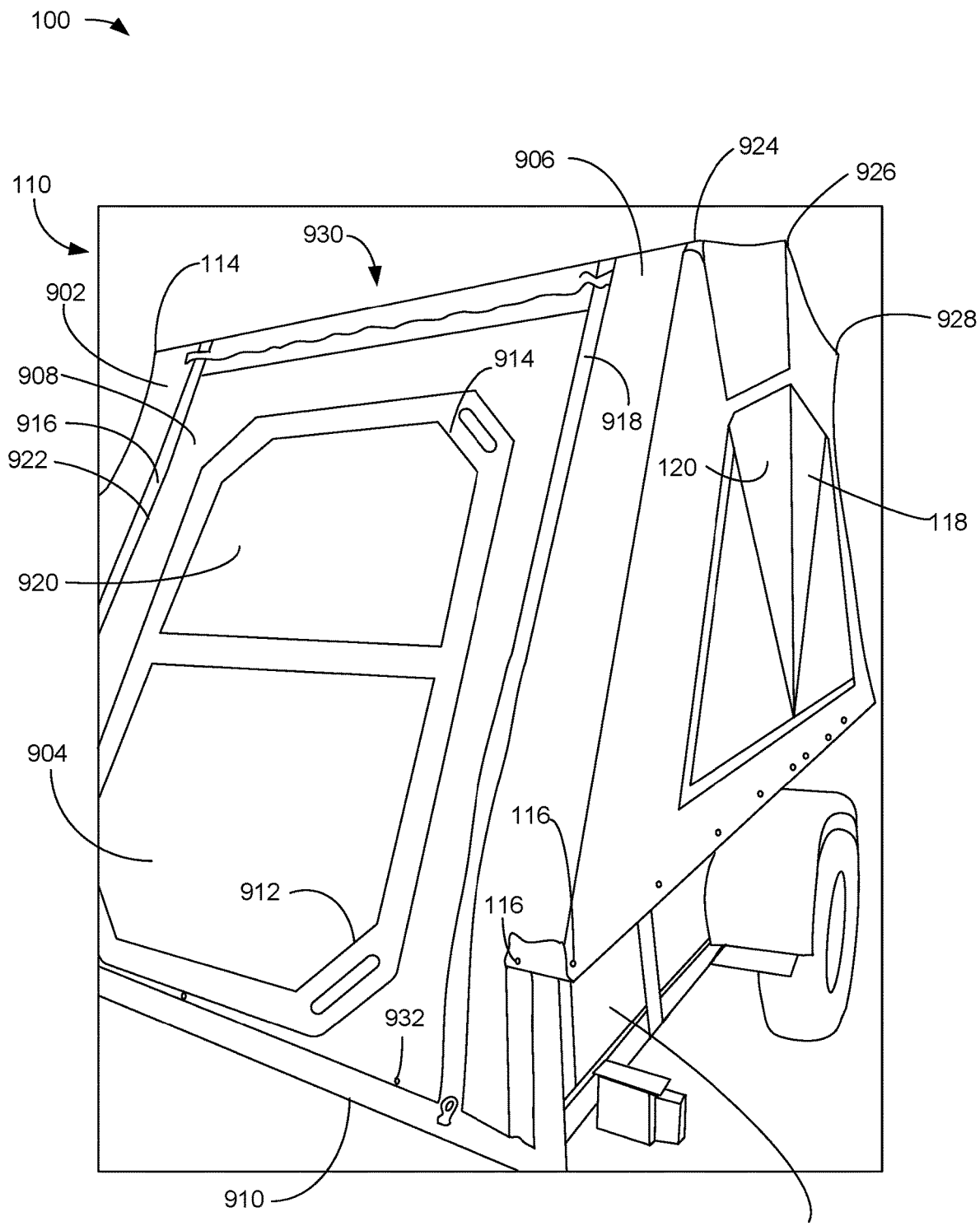
FIG. 9 is rear corner perspective view illustrating an exemplary exterior side wall portion of the exemplary embodiment of the edge-stowable tent for trailer system of FIG. 1 in a deployed configuration, according to a preferred embodiment of the present invention.

FIG. 9 is an exterior right rear corner perspective view illustrating an exemplary exterior rear portion 110 of the exemplary embodiment of the edge-stowable tent for trailer system 100 of FIG. 1 in a deployed configuration, according to a preferred embodiment of the present invention. Rear panel 930 includes rear door 908 that is bounded by left and right flap-covered zippers 916 and 918 connected to left and right side panels 902 and 906, respectively, and by snap portions 932 (one of two visible labeled) that are complimentary to snaps 224. Zippers 916 and 918 are representative of linear closures (e.g., zip lock, hook and loop, magnetic strips, and the like) generally, as are other zippers referred to in this description. Rear door 908 includes mesh fabric window 920 with internally accessible zipper 914 to open a closure flap there behind. Rear door 908 also includes access flap 904, bounded by flap-covered internally and externally accessible zipper 912 on three sides and shares a fourth boundary with mesh fabric window 920 at the top.

FIG. 10 is a rear perspective view illustrating an exemplary interior front wall portion of the exemplary embodiment of the edge-stowable tent for trailer system 100 of FIG. 1 in a deployed configuration, according to a preferred embodiment of the present invention. Rear door 908 has been unzipped along zippers 916 and 918, rolled up, and secured with three tie-up straps 1006 (one of three labeled). Deployable internal tent supports 412, 414, and 416 are squared U-shaped structures with cross bars 1002 (one visible labeled). In a particular embodiment, the squared-off U-shaped structures may have smooth rounded corners. Front deployable internal tent support 416 can be seen in its entirety in this view. Center and rear deployable internal tent supports 412 and 414 are similar to front deployable internal tent support 416. Front tent wall 1028 includes a mesh window covered with zippered front window flap 1030.

Left rear support bar 212 and left front support bar 1022 can be seen on the top surface 502 of sidewall 122. Front support bar 1024 is supported on prior art front trailer wall 206, which is obscured by stowage cover 128. Stowage cover 128 is illustrated in three parts: front, forward left side, and forward right side. In a particular embodiment, stowage cover 128 may be all one piece.

Optional prior art trailer bed 202 is preferably strong enough to support a motor toy in transport. Optional prior art ramp 130 is preferably strong enough to support a motor toy in loading and unloading from prior art flatbed trailer 104.

Figure 11A:
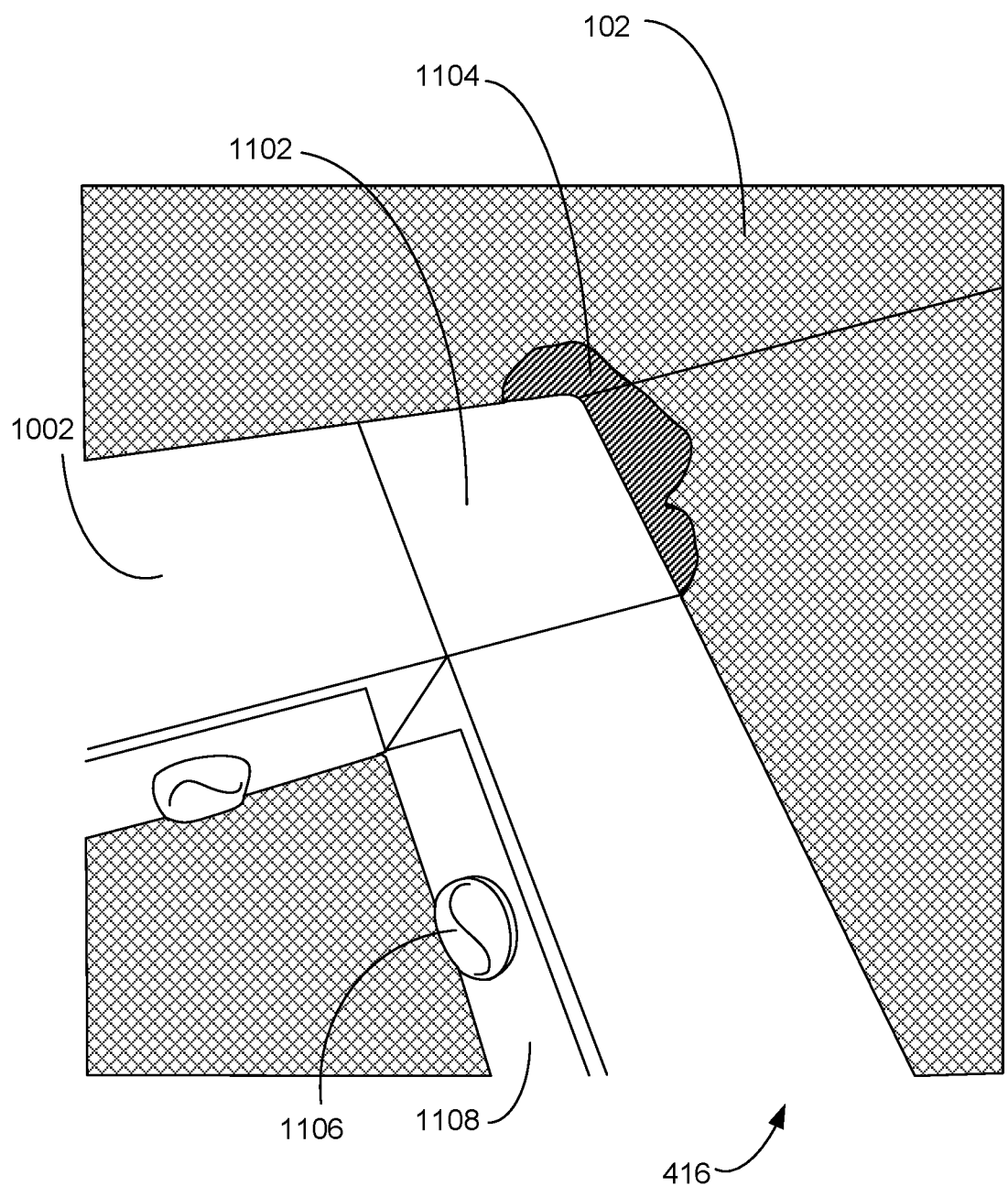
FIG. 11A is an interior perspective view illustrating an exemplary deployable tent support of the exemplary embodiment of the edge-stowable tent for trailer system of FIG. 1 in a deployed configuration, according to a preferred embodiment of the present invention.

FIG. 11A is an interior perspective view illustrating an exemplary front deployable tent support 416 of the exemplary embodiment of the edge-stowable tent for trailer system 100 of FIG. 1 in a deployed configuration, according to a preferred embodiment of the present invention. Corner piece 1102 joins crossbar 1002 and upright 1108 of deployable front internal tent support 416 via internal structures cam locked 1106 (one of two labeled) together. Pad 1104 is adhered to edge-stowable tent 102 to prevent damage to the tent fabric. In another embodiment, corner piece 1102 has a smooth and curved outer corner surface to avoid damage to edge-stowable tent 102.

In various other embodiments, respective various other deployable internal tent supports 412, 414, and 416 may be used. For non-limiting examples, metal pipes, PVC pipes, single piece bent bars, tubes, or channels and various materials such as bamboo, plastics, or epoxy composites may suffice in various embodiments.

Figure 11B:
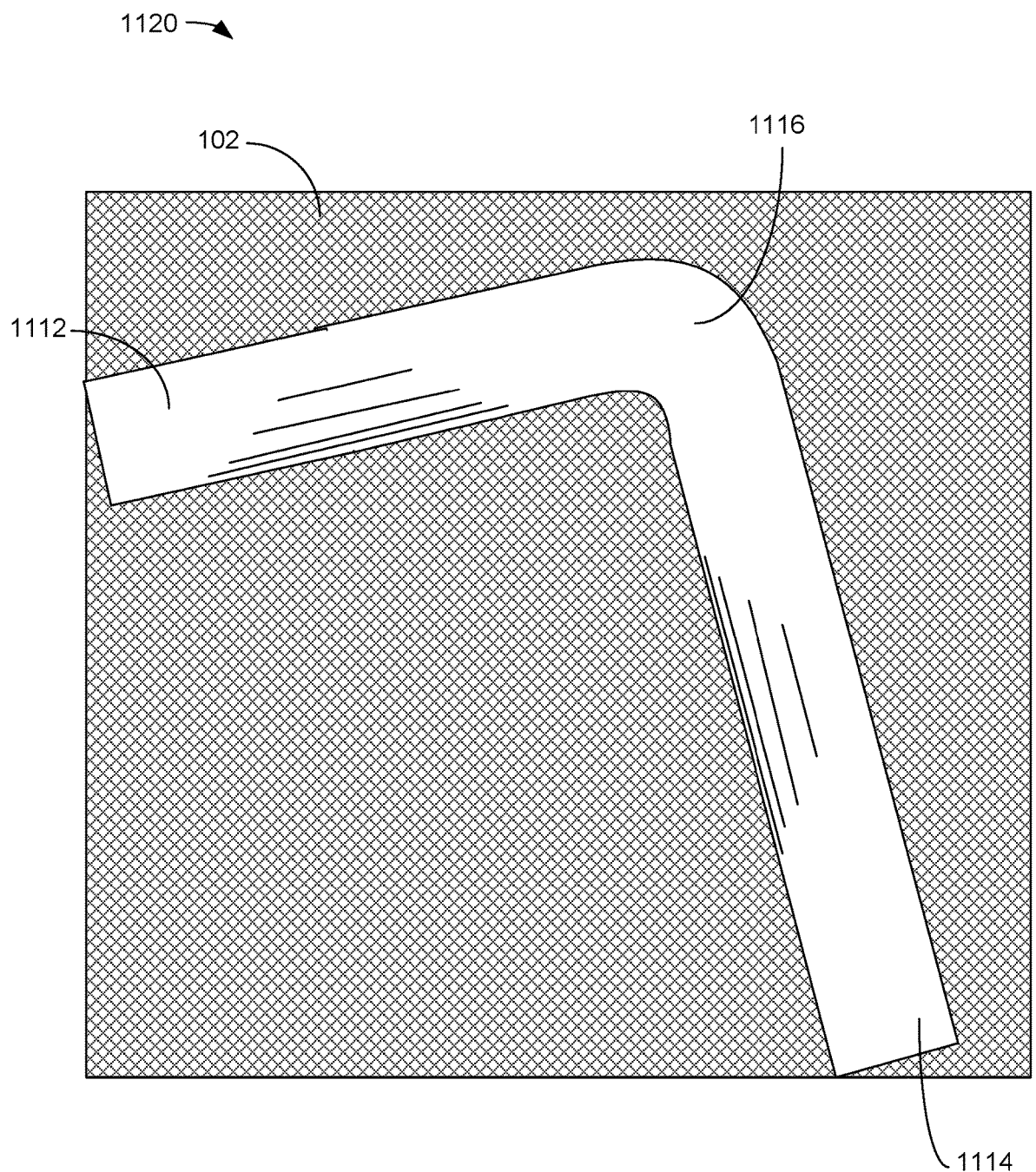
FIG. 11B is an interior perspective view illustrating a second exemplary embodiment of an interior support of the exemplary embodiment of the edge-stowable tent for trailer system of FIG. 1 in a deployed configuration, according to a preferred embodiment of the present invention.

FIG. 11B is an interior perspective view illustrating a second exemplary embodiment of a deployable tent support 1120 of the exemplary embodiment of the edge-stowable tent for trailer system 100 of FIG. 1 in a deployed configuration, according to a preferred embodiment of the present invention. Interior tent support 1120 is a bent tube 1116 having a generally vertical leg 1114 when deployed, and a horizontal section 1112 leading to a second bend 1116 into a second generally vertical leg 1114 to form a squared-off U-shaped interior tent support 1120. In a particular embodiment, generally vertical legs 1114 may taper to a square cross section before engaging support mounting 410. In another particular embodiment, support mounting 410 may be adapted to receive tubular internal supports 1120 in place of internal supports 412, 414, and 416.

Figure 12:
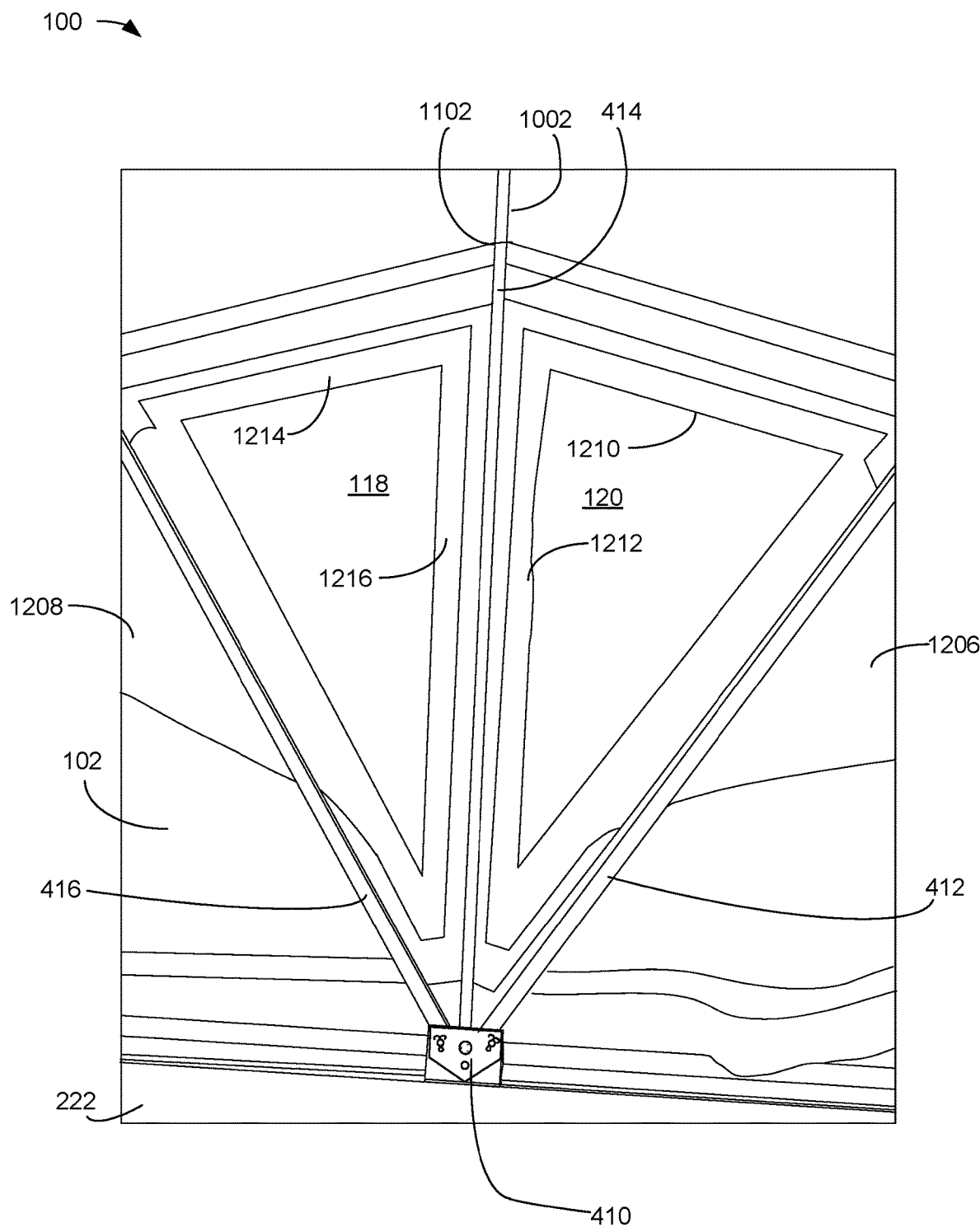
FIG. 12 is a perspective view illustrating an exemplary interior side wall portion of the exemplary embodiment of the edge-stowable tent for trailer system of FIG. 1 in a deployed configuration, according to a preferred embodiment of the present invention.

FIG. 12 is an interior perspective view illustrating an exemplary interior right-side wall portion of the exemplary embodiment of the edge-stowable tent for trailer system 100 of FIG. 1 in a deployed configuration, according to a preferred embodiment of the present invention. Deployable internal center tent support 414 includes corner piece 1102 and cross bar 1002. Polygonal mesh window 120 has a released internal covering flap 1206 that has releasable zipper closures 1210 and 1212. Polygonal mesh window 118 has a released internal covering flap 1208 that has releasable zipper closures 1214 and 1216. In various embodiments, various other linear closures may be used in place of zipper closures 1210, 1212, 1214, and 1216.

Figure 13:
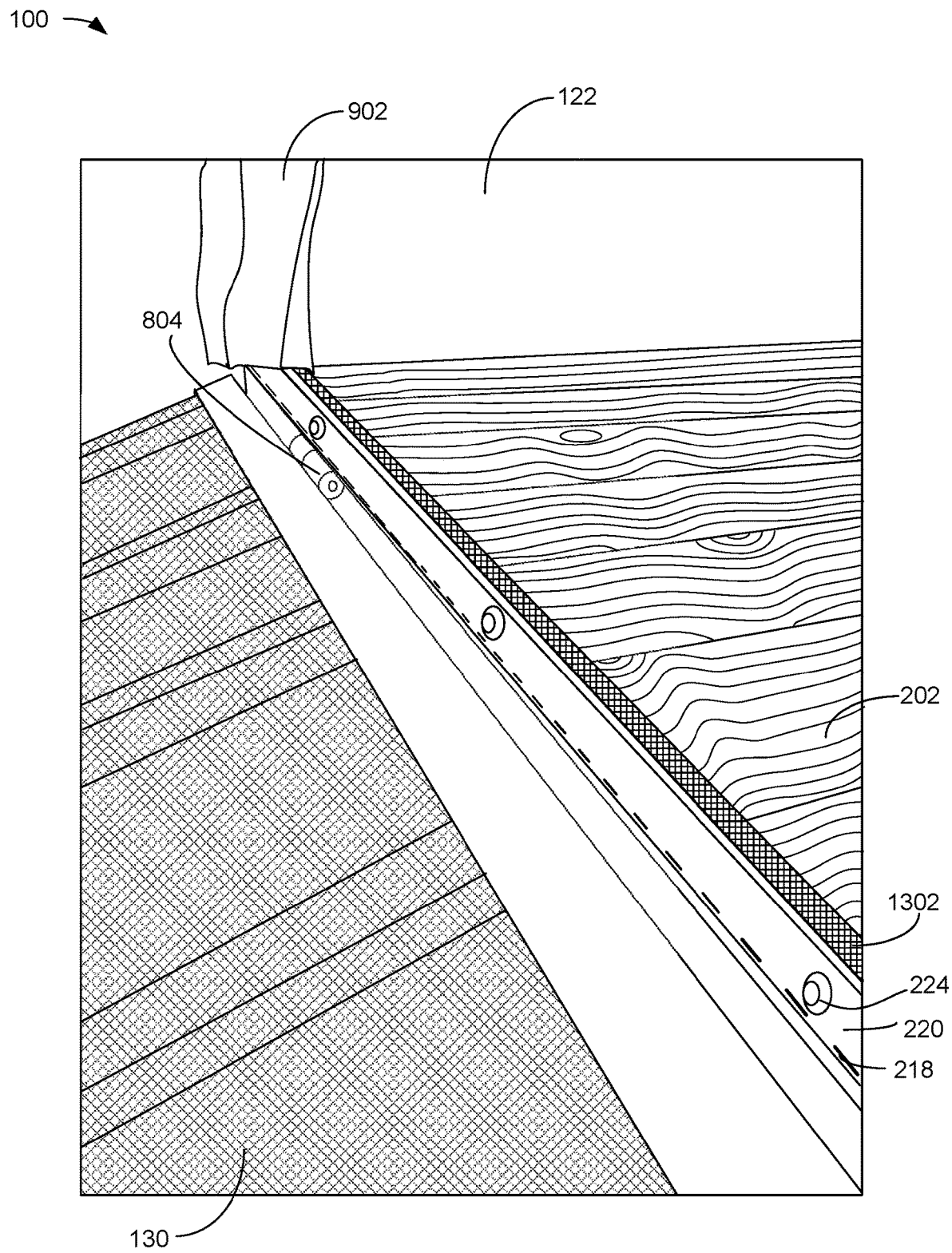
FIG. 13 is a rear side perspective view illustrating an exemplary portion of an exemplary piano hinge of the exemplary embodiment of the edge-stowable tent for trailer system of FIG. 1 in a deployed configuration, according to a preferred embodiment of the present invention.

FIG. 13 is rear right-side perspective view illustrating an exemplary portion of an exemplary piano hinge 218 of the exemplary embodiment of the edge-stowable tent for trailer system 100 of FIG. 1 in a deployed configuration, according to a preferred embodiment of the present invention. Optional prior art barrel hinge 804 is a prior art hinge for the prior art ramp 130. Piano hinge 218 has a bottom hinge flange 1302 fastened to prior art trailer bed 202 and a top hinge flange 220, shown rotated into a vertical position, that supports snaps 224 (one of three labeled) for securing a rear bottom edge of edge-stowable tent 102. When motor toys are being moved into or out of the prior art flatbed trailer 104, top hinge flange 220 is rotated to be adjacent to the bottom hinge flange 1302, thereby lying flat and avoiding interference with the movement of the motor toy.

Figure 14:
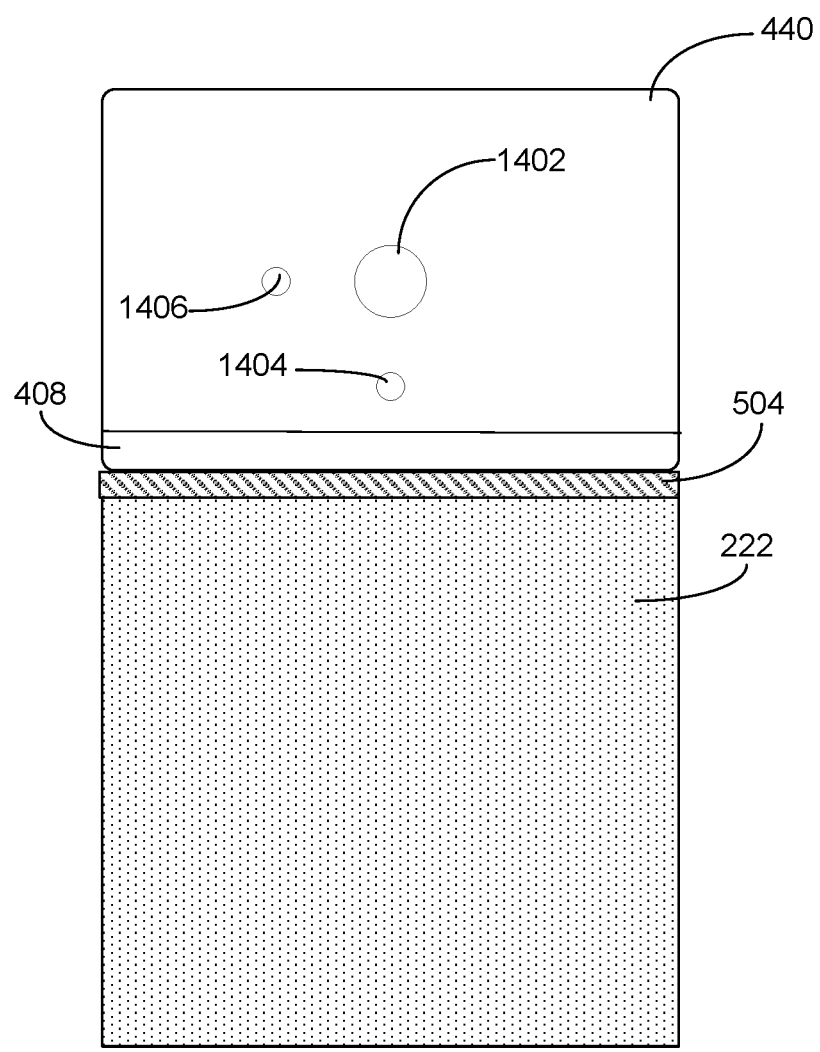
FIG. 14 is an interior elevation view illustrating an exemplary vertical portion of right-angled flange of the exemplary embodiment of the edge-stowable tent for trailer system of FIG. 1, according to a preferred embodiment of the present invention.

FIG. 14 is an interior right-side elevation view illustrating an exemplary vertical portion 440 of right-angled flange 408 of the exemplary embodiment of the edge-stowable tent for trailer system 100 of FIG. 1, according to a preferred embodiment of the present invention. Pivot bore 1402 is for receiving main pivot pin 422, stowed-position complimentary aligned bore 1406 is for receiving pin 602 when the tent is in the stowed position, and deployed-position complimentary pin bore 1404 is for receiving pin 602 when the tent is in the deployed position. The layer of weather stripping 504 can be seen between the right trailer sidewall 222 and the right-angled flange 408.

Figure 15:
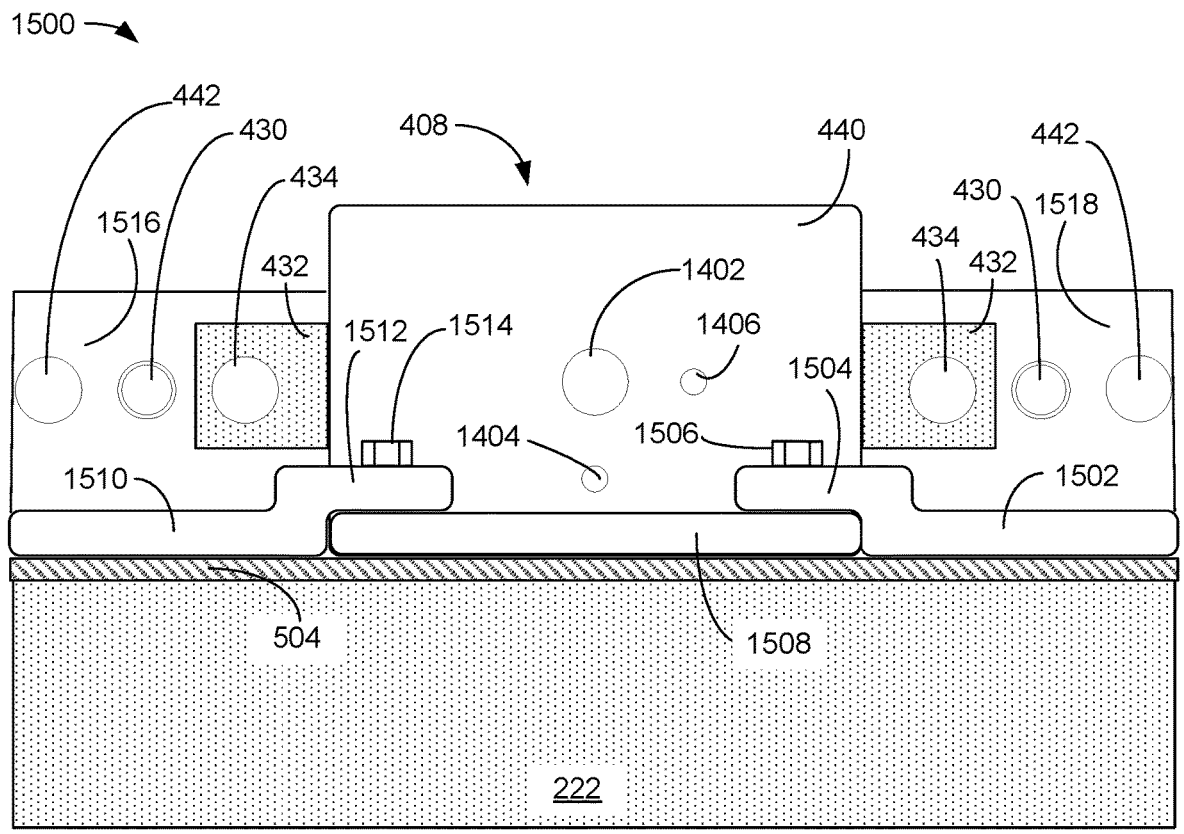
FIG. 15 is a right-side interior elevation view illustrating a second exemplary embodiment of support bars of the exemplary embodiment of the edge-stowable tent for trailer system of FIG. 1, according to a preferred embodiment of the present invention.

FIG. 15 is a right-side interior elevation view illustrating a second exemplary embodiment 1500 of support bars 1516 and 1518 of the exemplary embodiment of the edge-stowable tent for trailer system 100 of FIG. 1, according to a preferred embodiment of the present invention. Support bar 1518 has an overlapping horizontal portion 1504 extending from support bar 1518 horizontal portion 1502, enabling the use of one bolt 1506 to fasten both the overlapping horizontal portion 1504 of support bar 1518 and the horizontal portion 1508 of right-angled flange 408 to the trailer right sidewall 222. Support bar 1516 has an overlapping horizontal portion 1512, extending from the support bar 1516 horizontal portion 1510, enabling the use of one bolt 1514 to fasten both the horizontal overlapping portion 1512 of support bar 1516 and the horizontal portion 1508 of right-angled flange 408 to the trailer right sidewall 222. The left side support bars are a mirror image of FIG. 15.

Figure 16:
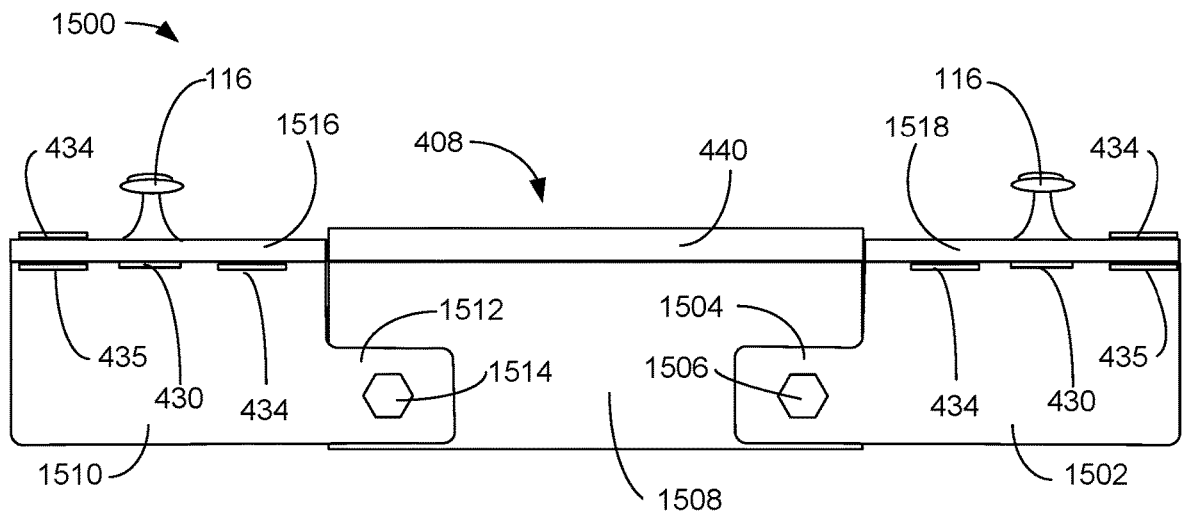
FIG. 16 is a top plan view illustrating the second exemplary embodiment of support bars of the exemplary embodiment of the edge-stowable tent for trailer system of FIG. 1, according to a preferred embodiment of the present invention.

FIG. 16 is a top plan view illustrating the second exemplary embodiment 1500 of support bars 1516 and 1518 of the exemplary embodiment of the edge-stowable tent for trailer system 100 of FIG. 1, according to a preferred embodiment of the present invention. The extent of the horizontal overlapping portion 1504 is partial, in order to allow room for the support mounting 410 to rotate. Likewise, the extent of the horizontal overlapping portion 1512 is partial, in order to allow room for the support mounting 410 to rotate. In a particular embodiment, the horizontal overlapping portions 1504 and 1512 may be complete, with corresponding change in the support mounting 410 and/or right-angled flange 408.

Figure 17:
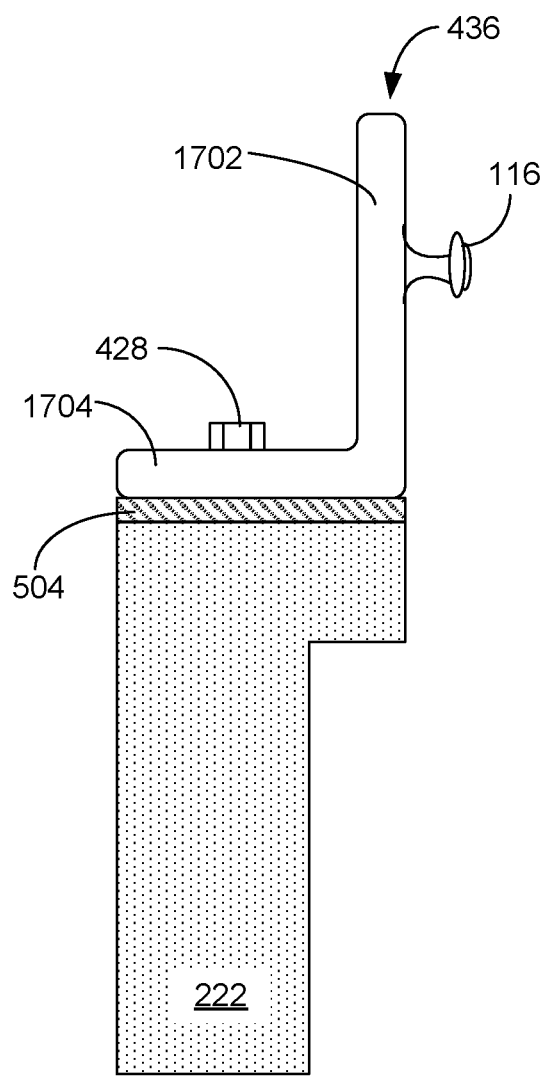
FIG. 17 is a cross sectional view illustrating the exemplary support bar of the exemplary embodiment of the edge-stowable tent for trailer system of FIG. 1, according to a preferred embodiment of the present invention.

FIG. 17 is a cross sectional view illustrating the exemplary right front support bar 436 of the exemplary embodiment of the edge-stowable tent for trailer system 100 of FIG. 1, according to a preferred embodiment of the present invention. The position of operationally horizontal portion 1704 of support bar 436 in relation to prior art trailer right sidewall 222 and to the layer of weather stripping 504 can be seen in this view. The cross section of left front support bar 1022 on prior art trailer left sidewall 122 is a mirror image of FIG. 17.

Figure 18:
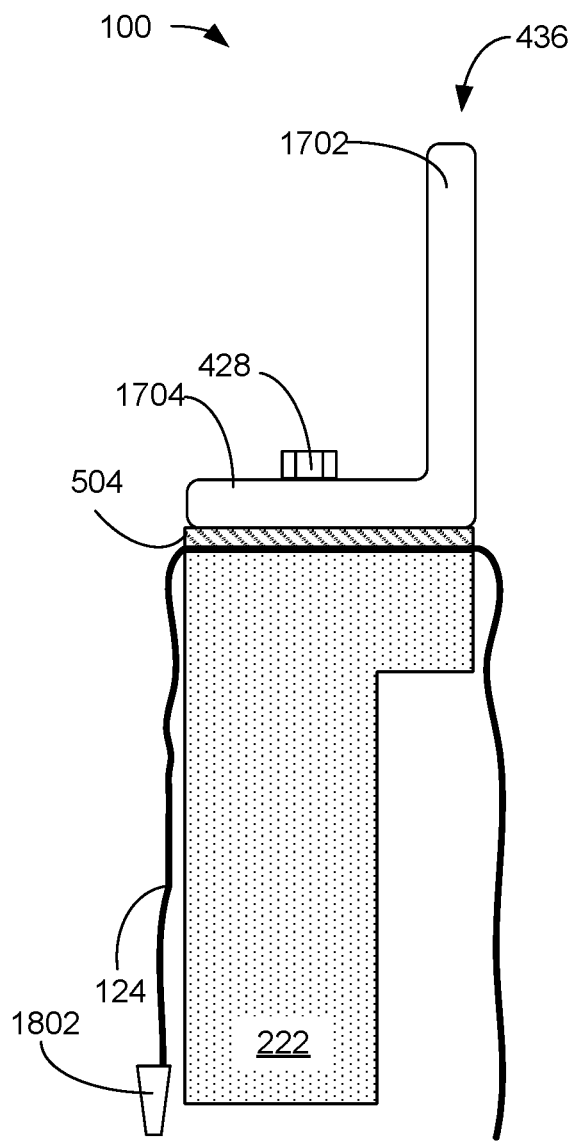
FIG. 18 is a cross sectional view illustrating the exemplary tie-down straps of the exemplary embodiment of the edge-stowable tent for trailer system of FIG. 1, according to a preferred embodiment of the present invention.

FIG. 18 is a cross sectional view illustrating the exemplary tie-down strap 124 of the exemplary embodiment of the edge-stowable tent for trailer system 100 of FIG. 1, according to a preferred embodiment of the present invention. Tie-down strap 124 is continuous between the prior art trailer right sidewall 222 and the layer of weather stripping 504. Buckle 1802 is preferably on the interior portion of the tie-down strap 124. In an additional embodiment, tie-down strap 124 is continuous between the horizontal portion 1704 of the right front support bar 1022 and the layer of weather stripping 504. The cross section of left front support bar 1022 on prior art trailer left sidewall 122 may be a mirror image of FIG. 18.

Figures 19, 20:
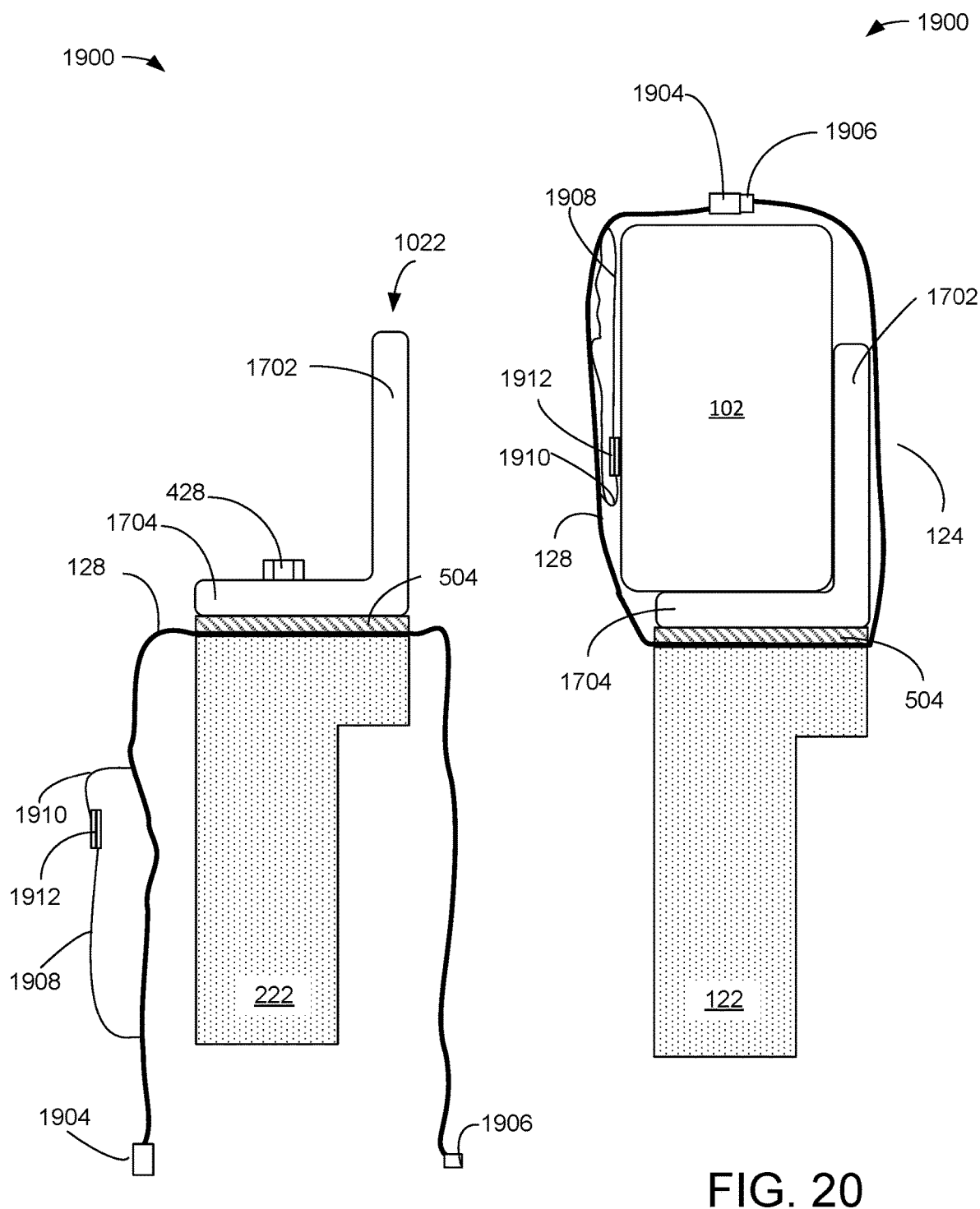
FIG. 19 is a cross sectional view illustrating an exemplary unzipped zippered cover of the exemplary embodiment of the edge-stowable tent for trailer system of FIG. 1, according to a preferred embodiment of the present invention.
FIG. 20 is a cross sectional view illustrating the exemplary zippered cover of the exemplary embodiment of the edge-stowable tent for trailer system of FIG. 1, according to a preferred embodiment of the present invention.

FIG. 19 is a cross sectional view illustrating an exemplary unzipped zippered stowage cover 128 of a second exemplary embodiment 1900 of the edge-stowable tent for trailer system 100 of FIG. 1, according to a preferred embodiment of the present invention. Zippered stowage cover 128 is continuous between the trailer right sidewall 222 and the layer of weather stripping 504 and the zippered cover 128 extends along the stowage length of the edge-stowable tent 102 when stowed. In a particular embodiment, zippered stowage cover 128 is in three parts. Zipper connectors 1904 and 1906 are conventional and complimentary. The interior portion of the zippered stowage cover 128 may have pockets, such as pocket 1908 with optional flap 1910 and closure 1912 for stowing various small articles when the edge-stowable tent 102 is deployed. In an additional embodiment, zippered stowage cover 128 is continuous between the horizontal portion 1704 of the support bar 1022 and the layer of weather stripping 504 and is continuous along the stowage portion of the edge-stowable tent 102, when stowed.

FIG. 20 is a cross sectional view illustrating the exemplary zippered cover 128 of the exemplary embodiment 1900 of the edge-stowable tent for trailer system 100 of FIG. 1, according to a preferred embodiment of the present invention. The zippered stowage cover 128 is shown closed around stowed edge-stowable tent 102. The zippered stowage cover 128 provides improved protection along the entire stowage length of the edge-stowable tent 102 against weather and road hazards. In a particular embodiment, the closure 1904, 1906 may be placed on the interior side of the sowed tent 102, rather than on the top, as shown.

Applicant calls special attention to the novelty of the edge-stowable tent 102 being stowable in a way that leaves the prior art bed 202 of prior art flatbed trailer 104 clear for other uses, as well as the design of the support mounting 410 and support bars 402, 436, 212, and 1022, and the unique combination of the rear door 908, rear mesh fabric window 920, and access flap 904.

The claims below include some functional claims and do not include any statements of intended use.

I claim:

1. An edge-stowable tent for trailer system comprising:
   a. a tent sized and shaped to be stowed:
      i. along a top surface of a first end of a flatbed trailer; and
      ii. along first and second portions of respective first and second opposed long side top surface portions extending from opposed ends of said first end of said flatbed trailer;
   b. a support bar aligned and affixed along said top surface of said first end;
   c. front and rear support bars aligned along each of said first and second opposed long side top surfaces of said flatbed trailer;
   d. first and second right-angled flanges aligned between said first and second support bars on respective first and second opposed long side top surfaces of said flatbed trailer;
   e. first and second vertical back end support bars:
      i. attached to opposing vertical rear ends of respective first and second sidewalls; and
      ii. supporting fasteners for securing lower rear side edges of said tent; and
   f. wherein said front, rear, and first end support bars comprise fasteners for securing bottom edges of said tent.

2. The system of claim 1, comprising:
   a. first and second support mountings pivotally attached to respective first and second right-angle flanges;
   b. wherein said first and second support mountings are pivotable between stowed and deployed configurations; and
   c. wherein said first and second support mountings are securable in stowed and in deployed configurations.

3. The system of claim 2, comprising front, center, and rear squared-off U-shaped internal tent supports each having first and second ends attached to respective said first and second support mountings;
   a. wherein said and front and rear squared-off U-shaped internal tent supports are pivotally attached to said first and second support mountings; and
   b. wherein said center squared-off U-shaped internal tent support is rigidly attached to said first and second support mountings.

4. The system of claim 3, comprising an actuator pivotally connected between said center squared-off U-shaped internal tent support and said flatbed trailer and operable to rotate said center squared-off U-shaped internal tent support from a stowed position to a deployed position.

5. The system of claim 3, wherein said opposed long top surfaces and said front top surface of said flatbed trailer comprise one of:
   a. first and second opposed long top trailer frame surfaces and a front top trailer frame surface of said flatbed trailer; and
   b. first and second opposed long top surfaces of respective first and second sidewalls of said flatbed trailer and a top surface of a front wall of said flatbed trailer.

6. The system of claim 1, comprising a piano hinge having first and second hinged panels, wherein:
   a. said first hinged panel is attachable to a rear edge of a flat bed of said flatbed trailer; and
   b. said second hinged panel comprises attachments operable to:
      i. assist in securing a rear edge of said tent, when said second hinged panel is rotated into a vertical position; and
      ii. assist rolling cargo to enter or leave said flatbed trailer when said second hinged panel is rotated into a horizontal position.

7. The system of claim 3, said tent further comprising:
   a. a rear tent panel having a rear door:
      i. bounded on opposing sides by first and second flap-covered linear closures that are accessible from inside and from outside said tent;
      ii. of one piece with said tent at a top of said rear panel; and
      iii. releasably fastenable to said fasteners on said second panel of said piano hinge;
   b. an access flap in said rear door bounded by a third flap-covered, internally and externally accessible, linear closure;
   c. a mesh fabric window in said rear door with internally accessible linear closure to open an internal window closure flap;
   d. left and right tent side center portions each having front and rear polygonal windows;
   e. a mesh fabric window in a front portion of said tent having an internally accessible linear closure to open an internal window closure flap; and
   f. a plurality of interior tent reinforcements corresponding to corners of said front, center, and rear squared off U-shaped tent supports.

8. The system of claim 1, comprising:
   a. a first layer of closed-cell foam elastomer abutting an underneath side of said support bar along said front end top surface of said flatbed trailer;
   b. a first layer of closed-cell foam elastomer abutting underneath sides of said front and rear support bars and of said support mounting on said first long side top surface of said flatbed trailer; and
   c. a second layer of closed-cell foam elastomer abutting underneath sides of said front and rear support bars and said support mounting on said second long side top surface of said flatbed trailer.

9. The system of claim 8, comprising at least one of:
a. a plurality of spaced-apart stowage straps installed between said front end top surface, said first long side top surface, and second long side top surface of said flatbed trailer and respective said first, second, and third layers of closed-cell foam elastomer, wherein each stowage strap has first and second releasably attachable ends respectively extending inside and outside said flatbed trailer, respectively operable to stow said tent to said front support bar, said first long side front and rear support bars, and said second long side top front and rear support bars; and
b. a cover installed between said front end top surface, said first long side top surface, and second long side top surface of said flatbed trailer and respective said first, second, and third layers of closed-cell foam elastomer, wherein said cover extends inside and outside said flatbed trailer and is operable to enclose and secure said tent in a stowed configuration.

10. The system of claim 9, comprising at least one pocket on said inside extent of said cover.

11. The system of claim 1, comprising an overlapping horizontal portion of said front and rear support bars attachable to each said first and second long side top surfaces of said flatbed trailer, said overlapping horizontal portion:
a. overlapping adjacent horizontal portions of said respective first and second right-angled flanges; and
b. having a fastener opening aligned to a fastener opening in each said first and second right-angled flanges.

12. An edge-stowable tent for trailer system comprising:
a. a tent sized and shaped to be stowed:
 i. along a top surface of a front end of a flatbed trailer; and
 ii. along first and second portions of respective left and right opposed long side top surface portions extending from opposed ends of said front end of said flatbed trailer;
b. a support bar aligned and connectable along said top surface of said front end;
c. front and rear support bars aligned and connectable along each of said first and second opposed long side top surfaces of said flatbed trailer;
d. first and second right-angled flanges aligned and connectable between said front and rear support bars on respective said first and second opposed long side top surfaces of said flatbed trailer;
e. an overlapping horizontal portion of said front and rear support bars attachable to each said first and second long side top surfaces of said flatbed trailer, said overlapping horizontal portion:
 i. overlapping adjacent horizontal portions of said respective first and second right-angled flanges; and
 ii. having a fastener opening aligned to a fastener opening in each said first and second right-angled flanges;
f. first and second support mountings pivotally attached to respective first and second right-angle flanges;
g. wherein said first and second support mountings are pivotable between stowed and deployed configurations; and
h. wherein said first and second support mountings are securable in stowed and in deployed configurations;
i. wherein said opposed long top surfaces and said front top surface of said flatbed trailer comprise one of:
 i. first and second opposed long top trailer frame surfaces and a front top trailer frame surface of said flatbed trailer; and
 ii. first and second opposed long top surfaces of respective first and second sidewalls of said flatbed trailer and a top surface of a front wall of said flatbed trailer; and
j. a piano hinge having first and second hinged panels, wherein:
 i. said first hinged panel is attachable to a rear edge of a flat bed of said flatbed trailer; and
 ii. said second hinged panel comprises attachments operable to:
  1 assist in securing a rear edge of said tent, when said second hinged panel is rotated into a vertical position; and
  2 assist rolling cargo to enter or leave said flatbed trailer when said second hinged panel is rotated into a horizontal position.

13. The system of claim 12, comprising front, center, and rear squared-off U-shaped internal tent supports each having first and second ends attached to respective said first and second support mountings;
a. wherein said and front and rear squared-off U-shaped internal tent supports are pivotally attached to said first and second support mountings; and
b. wherein said center squared-off U-shaped internal tent support is rigidly attached to said first and second support mountings.

14. The system of claim 13, comprising an actuator pivotally connected between said center squared-off U-shaped internal tent support and said flatbed trailer and operable to rotate said center squared-off U-shaped internal tent support from a stowed position to a deployed position.

15. The system of claim 13, said tent further comprising:
a. a rear tent panel having a rear door:
 i. bounded on opposing sides by first and second flap-covered linear closures that are accessible from inside and outside said tent;
 ii. of one piece with said rear tent panel tent at a top of said rear door; and
 iii. releasably fastenable to said fasteners on said second hinge panel of said piano hinge;
b. an access flap in said rear door bounded by a third flap-covered, internally and externally accessible, linear closure;
c. a mesh fabric window in said rear door having an internally accessible linear closure to open an internal window closure flap;
d. left and right tent side center portions each having front and rear polygonal windows;
e. a mesh fabric window in a front portion of said tent having an internally accessible linear closure to open an internal window closure flap; and
f. a plurality of interior tent reinforcements corresponding to corners of said front, center, and rear squared off U-shaped tent supports.

16. The system of claim 12, wherein said support bars comprise:
a. wherein said support bars support fasteners for securing bottom edges of said tent;
b. first and second vertical back end support bars:
 i. attached to opposing vertical rear ends of respective first and second sidewalls; and
 ii. supporting fasteners for securing lower rear side edges of said tent;
c. a first layer of closed-cell foam elastomer abutting an underneath side of said support bar along said front end top surface of said flatbed trailer;

d. a first layer of closed-cell foam elastomer abutting underneath sides of said front and rear support bars and of said support mounting on said first long side top surface of said flatbed trailer;

e. a second layer of closed-cell foam elastomer abutting underneath sides of said front and rear support bars and said support mounting on said second long side top surface of said flatbed trailer; and f. at least one of:
   i. a plurality of spaced-apart stowage straps installed between said front end top surface, said first long side top surface, and second long side top surface of said flatbed trailer and respective said first, second, and third layers of closed-cell foam elastomer, wherein each stowage strap has first and second releasably attachable ends respectively extending inside and outside said flatbed trailer, respectively operable to stow said tent to said front support bar, said first long side front and rear support bars, and said second long side top front and rear support bars;
   ii. a cover installed between said front end top surface, said first long side top surface, and second long side top surface of said flatbed trailer and respective said first, second, and third layers of closed-cell foam elastomer, wherein said cover extends inside and outside said flatbed trailer and is operable to enclose and secure said tent in a stowed configuration; and
   iii. at least one pocket on said inside extent of said cover.

17. An edge-stowable tent for trailer system comprising:
a. a tent sized and shaped to be stowed:
   i. along a top surface of a front end of a flatbed trailer; and
   ii. along first and second portions of respective left and right opposed long side top surface portions extending from opposed ends of said front end of said flatbed trailer;
b. a support bar aligned and connectable along said top surface of said front end;
c. front and rear support bars aligned and connectable along each of said first and second opposed long side top surfaces of said flatbed trailer;
d. first and second right-angled flanges aligned and connectable between said front and rear support bars on respective said first and second opposed long side top surfaces of said flatbed trailer;
e. an overlapping horizontal portion of said front and rear support bars attachable to each said first and second long side top surfaces of said flatbed trailer, said overlapping horizontal portion:
   i. overlapping adjacent horizontal portions of said respective first and second right-angled flanges; and
   ii. having a fastener opening aligned to a fastener opening in each said first and second right-angled flanges;
f. first and second support mountings pivotally attached to respective first and second right-angle flanges;
g. wherein said first and second support mountings are pivotable between stowed and deployed configurations;
h. wherein said first and second support mountings are securable in stowed and in deployed configurations;
i. wherein said opposed long top surfaces and said front top surface of said flatbed trailer comprise one of:
   i. first and second opposed long top trailer frame surfaces and a front top trailer frame surface of said flatbed trailer; and
   ii. first and second opposed long top surfaces of respective first and second sidewalls of said flatbed trailer and a top surface of a front wall of said flatbed trailer;
j. wherein said support bars comprise fasteners for securing bottom edges of said tent;
k. first and second vertical back end support bars:
   i. attached to opposing vertical rear ends of respective first and second sidewalls; and
   ii. supporting fasteners for securing lower rear side edges of said tent;
l. a piano hinge having first and second hinged panels, wherein:
   i. said first hinged panel is attachable to a rear edge of a flat bed of said flatbed trailer; and
   ii. said second hinged panel comprises attachments operable to:
      1. assist in securing a rear edge of said tent, when said second hinged panel is rotated into a vertical position; and
      2. assist in rolling cargo to enter or leave said flatbed trailer when said second hinged panel is rotated into a horizontal position; and
m. front, center, and rear squared-off U-shaped internal tent supports each having first and second ends attached to respective said first and second support mountings:
   i. wherein said front and rear squared-off U-shaped internal tent supports are pivotally attached to said first and second support mountings;
   ii. wherein said center squared-off U-shaped internal tent support is rigidly attached to said first and second support mountings; and
   iii. an actuator pivotally connected between said center squared-off U-shaped internal tent support and said flatbed trailer and operable to rotate said center squared-off U-shaped internal tent support from a stowed position to a deployed position.

18. The system of claim 17, said tent further comprising:
a. a rear tent panel having a rear door:
   i. bounded on opposing sides by first and second flap-covered linear closures that are accessible from inside and outside said tent;
   ii. of one piece with said rear tent panel tent at a top of said rear door; and
   iii. releasably fastenable to said fasteners on said second hinge panel of said piano hinge;
b. an access flap in said rear door bounded by a third flap-covered, internally and externally accessible, linear closure;
c. a mesh fabric window in said rear door having an internally accessible linear closure to open an internal window closure flap;
d. left and right tent side center portions each having front and rear polygonal windows;
e. a mesh fabric window in a front portion of said tent having an internally accessible linear closure to open an internal window closure flap; and
f. a plurality of interior tent reinforcements corresponding to corners of said front, center, and rear squared off U-shaped tent supports.

* * * * *